United States Patent
Murakami et al.

(10) Patent No.: US 7,533,206 B2
(45) Date of Patent: May 12, 2009

(54) RESOURCE MANAGEMENT DEVICE

(75) Inventors: Daisuke Murakami, Kyoto (JP); Yuji Takai, Osaka (JP); Isao Kawamoto, Hyogo (JP)

(73) Assignee: Panasonic Corporation, Osaka (JP)

( * ) Notice: Subject to any disclaimer, the term of this patent is extended or adjusted under 35 U.S.C. 154(b) by 89 days.

(21) Appl. No.: 11/328,314

(22) Filed: Jan. 10, 2006

(65) Prior Publication Data
US 2006/0155904 A1  Jul. 13, 2006

(30) Foreign Application Priority Data
Jan. 12, 2005 (JP) ............ 2005-005065
Dec. 16, 2005 (JP) ............ 2005-362801

(51) Int. Cl.
*G06F 13/362* (2006.01)
(52) U.S. Cl. .......... 710/113; 710/244; 710/266
(58) Field of Classification Search ......... 710/240–244, 710/260–269, 100, 113; 711/113
See application file for complete search history.

(56) References Cited

U.S. PATENT DOCUMENTS

| | | | |
|---|---|---|---|
| 5,533,205 A | 7/1996 | Blackledge, Jr. et al. | |
| 5,948,089 A | 9/1999 | Wingard et al. | |
| 6,070,205 A | 5/2000 | Kato et al. | |
| 6,671,784 B2 * | 12/2003 | Lee | 711/151 |
| 7,006,501 B1 * | 2/2006 | Gura et al. | 370/395.42 |
| 7,062,582 B1 * | 6/2006 | Chowdhuri | 710/116 |
| 7,080,177 B2 * | 7/2006 | Neuman | 710/240 |
| 2004/0073730 A1 | 4/2004 | Horii et al. | |
| 2005/0080967 A1 * | 4/2005 | Ries et al. | 710/240 |
| 2005/0204085 A1 | 9/2005 | Fukuyama et al. | |

OTHER PUBLICATIONS

U.S. Office Action issued in U.S. Appl. No. 11/328,314, dated Jun. 7, 2007.

* cited by examiner

*Primary Examiner*—Clifford H Knoll
*Assistant Examiner*—Kim T Huynh
(74) *Attorney, Agent, or Firm*—McDermott Will & Emery LLP

(57) ABSTRACT

A bus arbitration section and a resource control section are interposed between a shared resource and a plurality of bus masters. The minimum number of receivable access permissions within a given period is set as bus arbitration information for each of the bus masters. If two or more of the bus masters issue access requests at the same time, the bus arbitration section preferentially gives access permission to a bus master which gained access permission a number of times less than a set value in the bus arbitration information within the given period, out of the two or more access bus masters.

20 Claims, 22 Drawing Sheets

RESOURCE MANAGEMENT DEVICE

BACKGROUND OF THE INVENTION

The present invention relates to a resource management device for arbitrating access requests issued from respective masters to at least one shared resource in a system.

In system LSI, a plurality of masters, such as a microprocessor, a DSP (Digital Signal Processor) and a DMA (Direct Memory Access) controller, access a shared resource such as a memory or a peripheral I/O (input/output) controller. This configuration needs a resource management device for efficiently arbitrating access requests from the respective masters to the shared resource.

According to a conventional technique, based on priority order information on the maters held in the form of a table, the resource management device arbitrates access requests at regular timings. A plurality of patterns of priority order information are stored in this table so that the patterns are sequentially switched from one to another at regular timings of arbitration. Each of the masters is allowed to gain access permission a number of times corresponding to the number of times the master is assigned the highest priority in the priority order patterns. Accordingly, the minimum access bandwidth for each master is guaranteed (see, US 2004/0073730 A1).

As described above, in a system in which a master having the highest priority is previously determined at each arbitration timing, a problem arises when access requests are issued unevenly with respect to time. For example, when a master which is assigned the highest priority at regular arbitration timings in one cycle issues access requests mainly in the first half of this cycle, a desired access bandwidth is not guaranteed for the master, causing a decrease in access efficiency. This is because the arbitration timings assigned the highest priority do not coincide with all the timings of issuing access requests.

If the masters issue access requests at irregular timings, it is difficult to previously determine a master assigned the highest priority at each arbitration timing so as to avoid the decease in access efficiency.

SUMMARY OF THE INVENTION

It is therefore an object of the present invention to provide a resource management device capable of guaranteeing a minimum bandwidth for each master without the necessity for previously determining a master having the highest priority at each arbitration timing.

In order to achieve this object, according to the present invention, the minimum number of times a master is allowed to gain access permission within a given period is set for each master and, if two or more masters issue access requests at the same time, access permission is preferentially given to a master which gained access permission a number of times less than a set value within the given period, out of these two or more masters.

Accordingly, even if access requests are issued unevenly with respect to time, each master is capable of gaining access permission a predetermined number of times within the given period, so that a desired access bandwidth to a shared resource is obtained.

If each of a plurality of access request masters gained access permission a number of times less than the set value within a given period out of two or more access request masters, it is sufficient to arbitrate the access requests according to a priority rule based on priority order information among the masters.

DETAILED DESCRIPTION OF THE INVENTION

Hereinafter, embodiments of the present invention will be specifically described with reference to the drawings. In the following descriptions, each bus master has the function of actively sending an address signal for data access, a control signal and other signals. In general, one functional block usually has a plurality of interfaces for bus connections, some of which function as bus masters, and the others as bus slaves. A processor of Harvard architecture, for example, has a bus master for sending instructions and a bus master for sending data.

Figure 1:
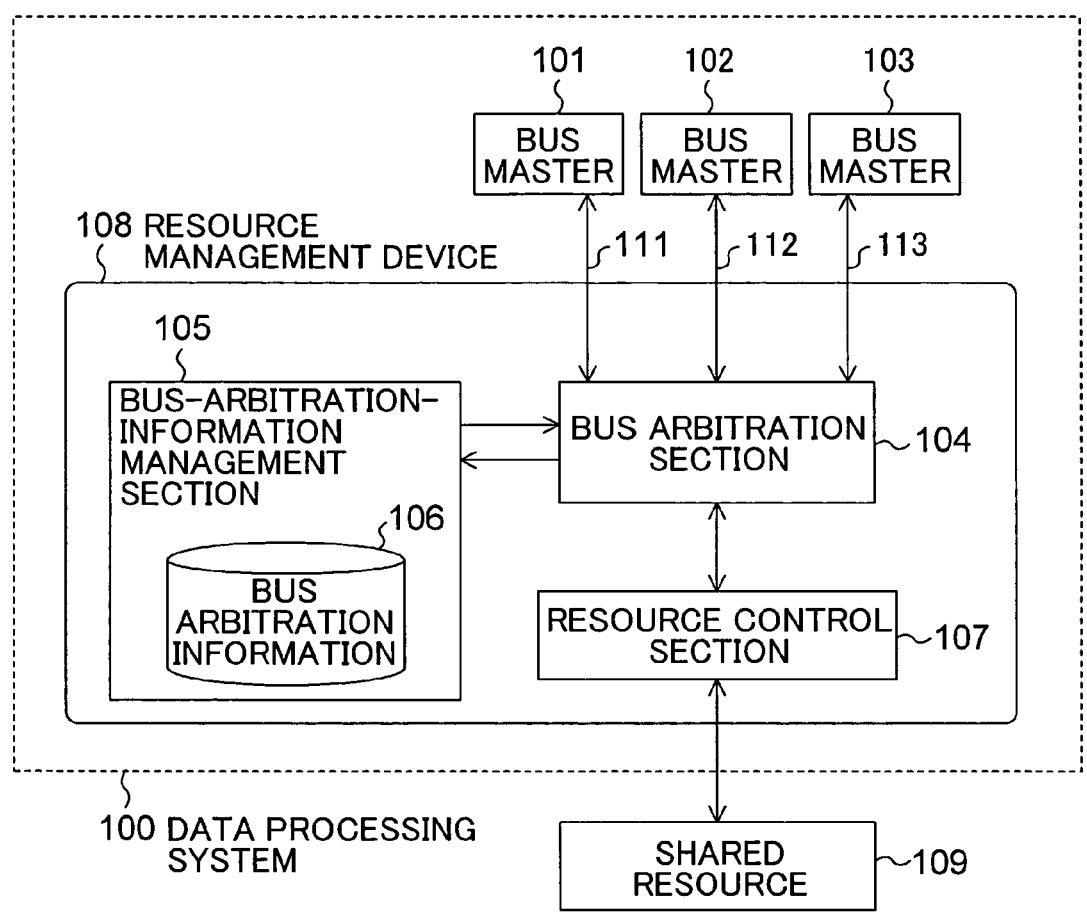
FIG. 1 is a block diagram illustrating an example of a configuration of a resource management device according to the present invention.

FIG. 1 illustrates an example of a configuration of a resource management device according to the present invention. A resource management device 108 illustrated in FIG. 1 is interposed between three bus masters 101, 102 and 103 and a shared resource 109 and includes: a bus arbitration section 104; a bus-arbitration-information management section 105; and a resource control section 107. Reference numeral 106 denotes bus arbitration information managed by the bus-arbitration-information management section 105. The first, second and third bus masters 101, 102 and 103 are connected to the bus arbitration section 104 through busses 111, 112 and 113, respectively. These first through third bus masters 101 through 103 and the resource management device 108 form one data processing system 100.

The bus-arbitration-information management section 105 manages a set value regarding the minimum number of allowable access permissions within a given period for each of the first through third bus masters 101 through 103 and also manages priority order information among these bus masters 101 through 103 as the bus arbitration information 106. On the other hand, each of the first through third bus masters 101 through 103 issues an access request to the shared resource 109 at an arbitrary timing. The bus arbitration section 104 arbitrates the access requests from the first through third bus masters 101 through 103 based on the bus arbitration information 106 and sends one of the access requests selected by this arbitration to the resource control section 107. In this case, if two or more of the bus masters issue access requests at the same time, the bus arbitration section 104 preferentially gives access permission to one of the two or more access request masters which gained access permission a number of times less than the set value in the bus arbitration information 106 within a given period. If each of two a plurality of bus masters gained access permission a number of times less than the set value out of the two or more access request masters, the bus arbitration section 104 arbitrates the access requests according to a priority rule based on priority order information among the bus masters 101 through 103 managed by the bus-arbitration-information management section 105. The resource control section 107 controls data transfer between the bus master selected by the bus arbitration section 104 and the shared resource 109.

Hereinafter, seven variations of the bus arbitration information 106 illustrated in FIG. 1 will be described as first through seventh embodiments. In the following embodiments, it is assumed that requests to give three, two and five access permissions to the first, second and third bus masters 101, 102 and 103, respectively, are provided in ten arbitration operations. Suppose a given amount of access to the shared resource 109 is allowed for each of the access permissions, 30%, 20% and 50% of access bandwidths are guaranteed for the first, second and third bus masters 101, 102 and 103, respectively.

EMBODIMENT 1

Figure 2:
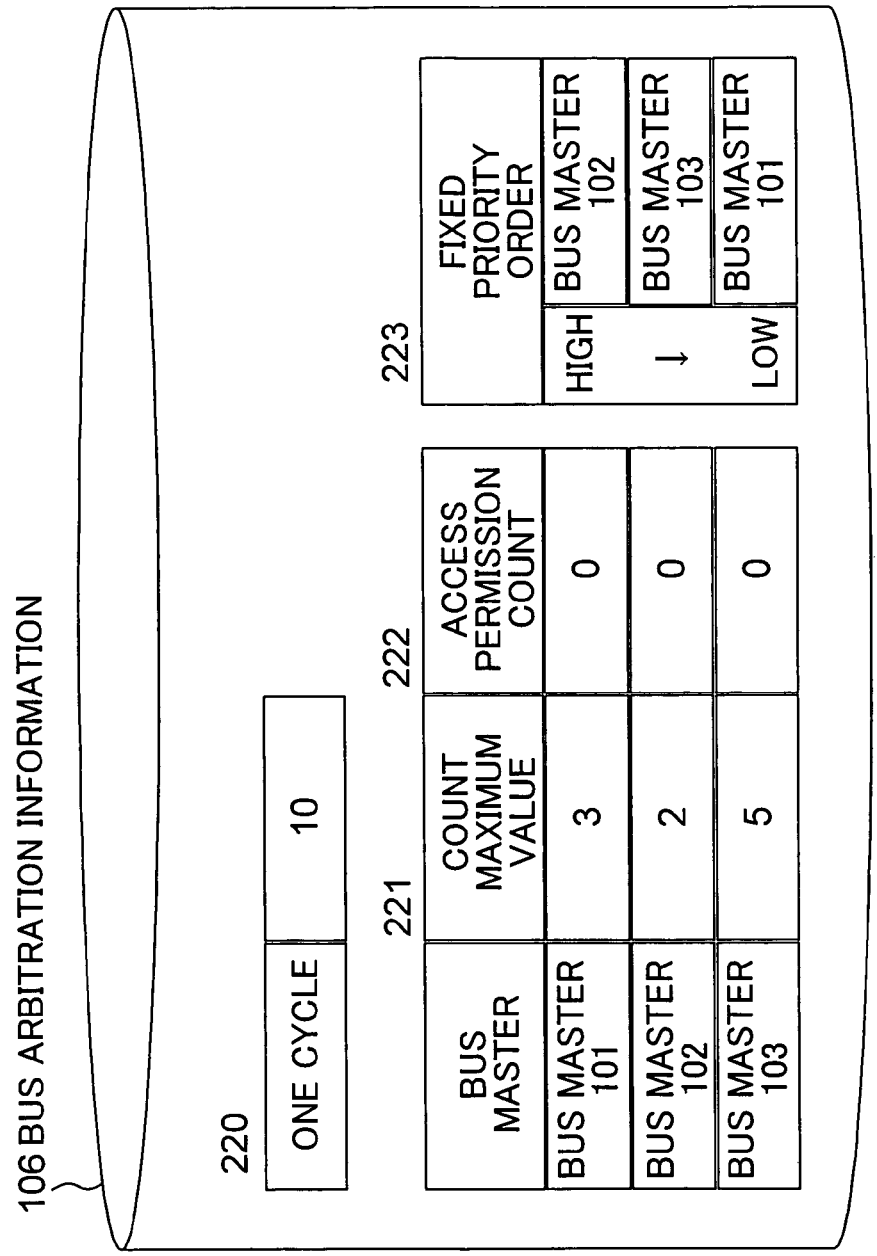
FIG. 2 is a conceptual view showing a first example of bus arbitration information in FIG. 1.

FIG. 2 shows a first example of the bus arbitration information 106 shown in FIG. 1. Reference numeral 220 denotes arbitration cycle information, reference numeral 221 denotes a count maximum value set for each of the bus masters, reference numeral 222 denotes access permission counts for the respective bus masters, and reference numeral 223 denotes priority order information. The arbitration cycle information 220 indicates the number of arbitrations performed by the bus arbitration section 104 in one cycle. In this case, "10" is set as the arbitration cycle information 220 and, therefore, 10 arbitration intervals correspond to one arbitration cycle. Each of the count maximum values 221 indicates the minimum number of times each of the first through third bus masters 101 through 103 is allowed to gain access permission within one arbitration cycle and is previously set such that the sum of the count maximum values 221 is equal to a set value in the arbitration cycle information 220. The count maximum values 221 in this case are 3, 2 and 5 for the first, second and third bus masters 101, 102 and 103, respectively. Each of the access permission counts 222 indicates the number of times each of the first through third bus masters 101 through 103 gained access permissions in one arbitration cycle, and is reset to zero at the beginning of a cycle. The priority order information 223 in this example indicates a fixed priority order among the first through third bus masters 101 through 103. Priorities are assigned to the second bus master 102, the third bus master 103 and the first bus master 101 in this order.

The bus arbitration section 104 periodically performs arbitration based on the bus arbitration information 106 shown in FIG. 2. When access permission is given to one of the first through third bus masters 101 through 103, the bus-arbitration-information management section 105 increments one of the access permission counts 222 associated with the bus master which gained access permission by one. When the bus arbitration section 104 performs arbitration a number of times specified by the arbitration cycle information 220, the bus-arbitration-information management section 105 resets all the access permission counts 222 to zero. If two or more of the first through third bus masters 101 through 103 issue access requests at the same time, the bus arbitration section 104 preferentially gives access permission to a bus master associated with the access permission count 222 less than the count maximum value 221 out of the two or more access request masters. Specifically, a condition for high-priority access permission is that the "remaining priority permission count" obtained by subtracting the access permission count 222 from the count maximum value 221 is one or more. If two or more bus masters are associated with the access permission counts 222 less than the count maximum values 221 out of the two or more access request masters, the bus arbitration section 104 arbitrates access requests from these bus masters according to a first priority rule based on the priority order information 223. If only one of the first through third bus masters 101 through 103 issues an access request, access permission is given to this bus master unconditionally.

Figure 3:
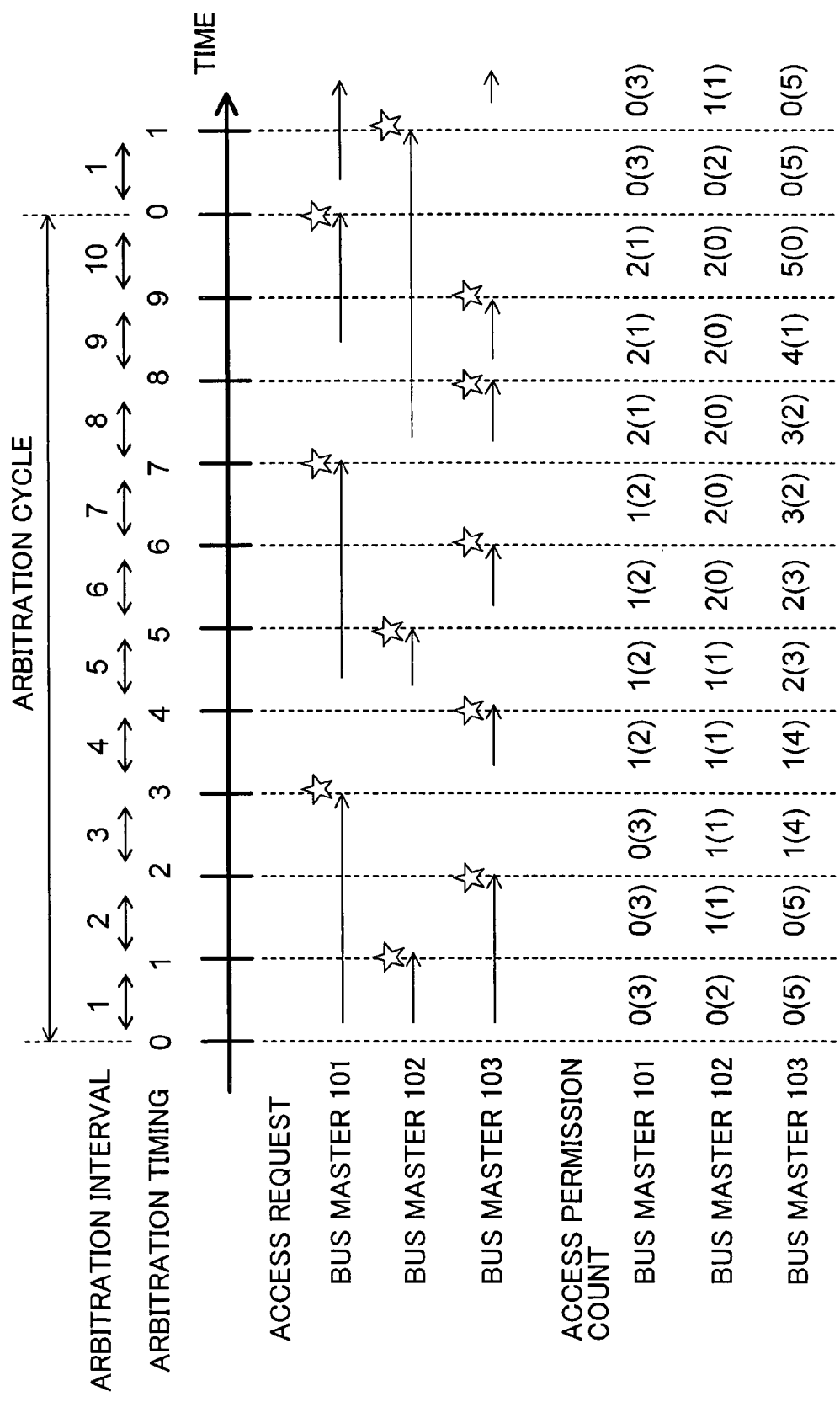
FIG. 3 is a timing diagram showing a first example of arbitration based on the bus arbitration information in FIG. 2.

FIG. 3 shows a first example of arbitration based on the bus arbitration information 106 in FIG. 2. In FIG. 3, the lateral direction represents time, and the bus arbitration section 104 performs arbitration at each timing indicated by a vertical line. This timing will be referred to as an "arbitration timing". In the upper part of FIG. 3, the intervals between arbitration timings are represented as arbitration intervals, and one arbitration cycle corresponding to 10 arbitration intervals is shown. A cycle of arbitration timings "0" through "9" is repeated. In the middle part of FIG. 3, it is shown how the first through third bus masters 101 through 103 issue access requests, and it is assumed that each of the access requests is issued during a period indicated by an allow. Each star indicates that a bus master gains access permission at an arbitration timing. In the bottom part of FIG. 3, the access permission counts 222 associated with the first through third bus masters 101 through 103 at the respective arbitration intervals are shown. Values inside the parentheses represent remaining priority permission counts for the first through third bus masters 101 through 103.

In the example of FIG. 3, at arbitration timing 1, all the first through third bus masters 101 through 103 issue access requests. At this arbitration timing 1, the access permission counts 222 associated with all the bus masters are zero and less than the respective count maximum values 221, so that arbitration is performed on all the bus masters based on the priority order information 223. As a result, the second bus master 102 having the highest priority gains access permission. When the bus arbitration section 104 gives access permission to the second bus master 102, the bus-arbitration-information management section 105 increments the access permission count 222 associated with the second bus master 102 by one. At next arbitration timing 2, the first bus master 101 and the third bus master 103 issue access requests, and the access permission counts 222 associated with these bus masters are less than the respective count maximum values 221, as at the arbitration timing 1, so that arbitration is performed on both of the bus masters based on the priority order information 223. As a result, the third bus master 103 gains access permission. The bus-arbitration-information management section 105 increments the access permission count 222 associated with the third bus master 103 by one. Then, at arbitration timing 3, only the first bus master 101 issues an access request, so that the bus arbitration section 104 gives access permission to the first bus master 101, and the bus-arbitration-information management section 105 increments the access permission count 222 associated with the first bus master 101 by one. At arbitration timings 4, 5, 6 and 7, arbitration is performed in the same manner. At arbitration timing 8, the second bus master 102 and the third bus master 103 issue access requests. The access permission count 222 associated with the second bus master 102 has reached the count maximum value 221 and the access permission count 222 associated with the third bus master 103 is less than the count maximum value 221, so that the bus arbitration section 104 gives access permission to the third bus master 103. The bus-arbitration-information management section 105 increments the access permission count 222 associated with the third bus master 103 by one. Thereafter, arbitration is performed in the same manner and, when arbitration at the last arbitration timing 0 is completed, the access permission counts 222 are reset to zero and one cycle of arbitration is completed. Hereinafter, similar arbitration is performed periodically.

At each of the arbitration timings, a bus master which gained access permission is allowed to access the shared resource 109 through the resource control section 107. The resource control section 107 performs control such that each of the bus masters is allowed to have a constant amount of access to the shared resource 109 in one access permission, for example. It should be noted that the amount of access at a time may vary depending on characteristics of the shared resource 109.

As described above, in the example illustrated in FIGS. 2 and 3, the higher the fixed priority of a bus master is, the shorter the time before the bus master gains access permission after issuing an access request is. Accordingly, response performance is enhanced.

Figure 4:
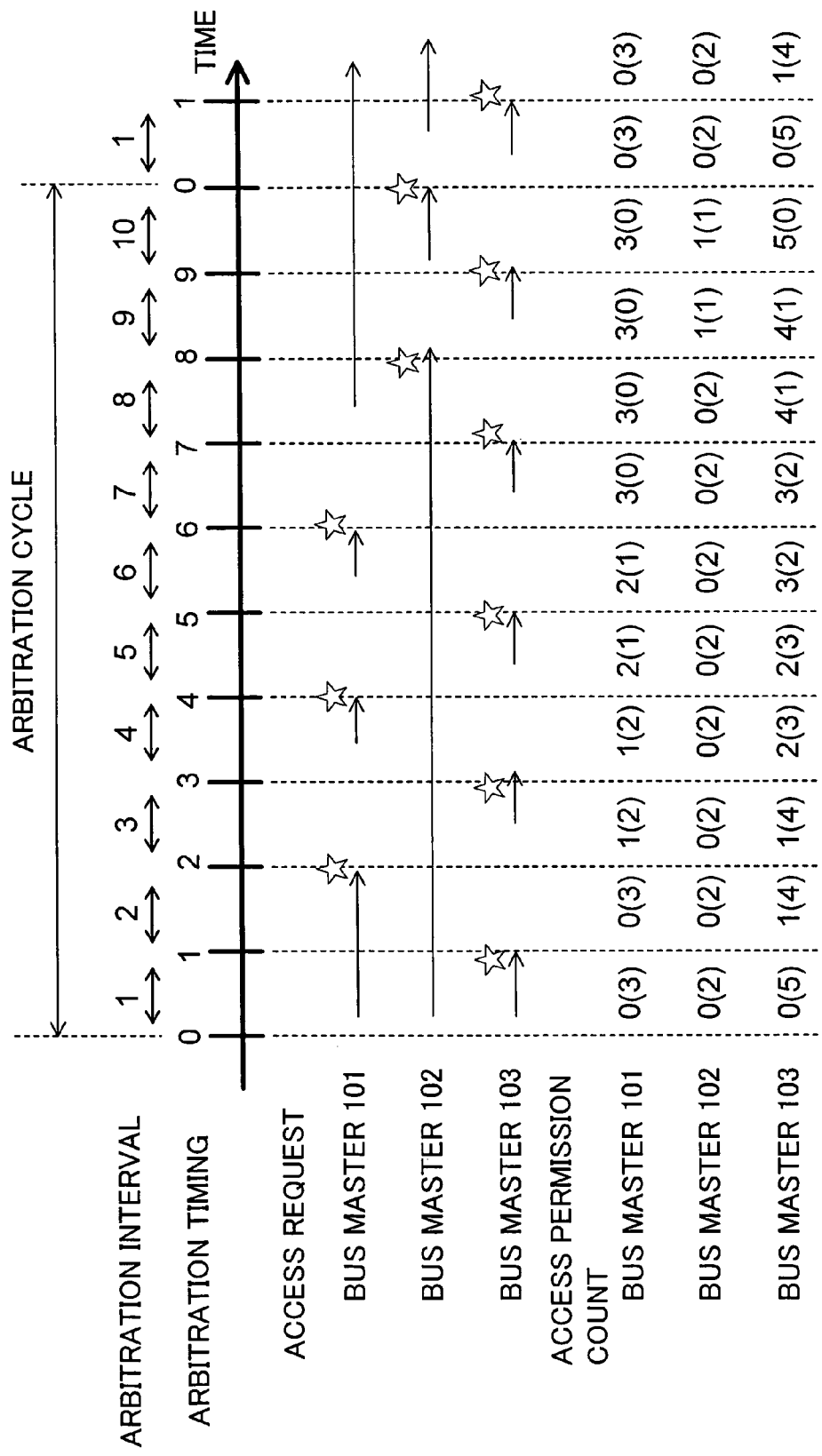
FIG. 4 is a timing diagram showing a second example of arbitration based on the bus arbitration information in FIG. 2.

FIG. 4 shows a second example of arbitration based on the bus arbitration information 106 in FIG. 2. It should be noted that in the priority order information 223 in this example, a fixed priority order among the first through third bus masters 101 through 103 is determined according to the count maximum values 221, so that a bus master associated with a larger count maximum value 221 is assigned higher priority. In the example shown in FIG. 2, the count maximum values 221 associated with the first, second and third bus masters 101, 102 and 103 are 3, 2 and 5, respectively, so that priorities are assigned to the third bus master 103, the first bus master 101 and the second bus master 102 in this order. If the count maximum values 221 are the same, the first bus master 101 has priority over the second and third bus masters 102 and 103, and the second bus master 102 has priority over the third bus master 103.

In the example of FIG. 4, at arbitration timing 1, all the first through third bus masters 101 through 103 issue access requests. At this arbitration timing 1, the access permission counts 222 associated with all the bus masters are zero and less than the respective count maximum values 221, so that arbitration is performed on all the bus masters based on the priority order information 223. As a result, the third bus master 103 associated with the largest count maximum value 221 gains access permission. When the bus arbitration section 104 gives access permission to the third bus master 103, the bus-arbitration-information management section 105 increments the access permission count 222 associated with the third bus master 103 by one. At next arbitration timing 2, the first bus master 101 and the second bus master 102 issue access requests and the access permission counts 222 associated with these bus masters are less than the respective count maximum values 221, as at the arbitration timing 1, so that arbitration is performed on both of the bus masters based on the priority order information 223. As a result, the first bus master 101 gains access permission. The bus-arbitration-information management section 105 increments the access permission count 222 associated with the first bus master 101 by one. Thereafter, at arbitration timings 3 through 7, arbitration is performed in the same manner. At arbitration timing 8, the first bus master 101 and the second bus master 102 issue access requests. The access permission count 222 associated with the first bus master 101 has reached the count maximum value 221 and the access permission count 222 associated with the second bus master 102 is less than the count maximum value 221, so that the bus arbitration section 104 gives access permission to the second bus master 102. The bus-arbitration-information management section 105 increments the access permission count 222 associated with the second bus master 102 by one. Thereafter, arbitration is performed in the same manner and, when arbitration at the last arbitration timing 0 is completed, the access permission counts 222 are reset to zero and one cycle of arbitration is completed. Hereinafter, similar arbitration is performed periodically.

As described above, in the example of FIG. 4, the scheme of determining the priorities according to the count maximum values 221 is employed, so that access permission is allowed to be given early to, for example, a bus master associated with a count maximum value 221 which is set at a large value, and concentration of access permissions in the latter half of a cycle is avoided. Accordingly, accesses to the shared resource 109 are performed with sufficient time.

The priority order information 223 may be set such that a smaller count maximum value 221 has a higher priority. If the count maximum values 221 are the same, the priorities may be arbitrarily set in a fixed order or may be set by using round robin scheduling or by any other method.

Figure 5:
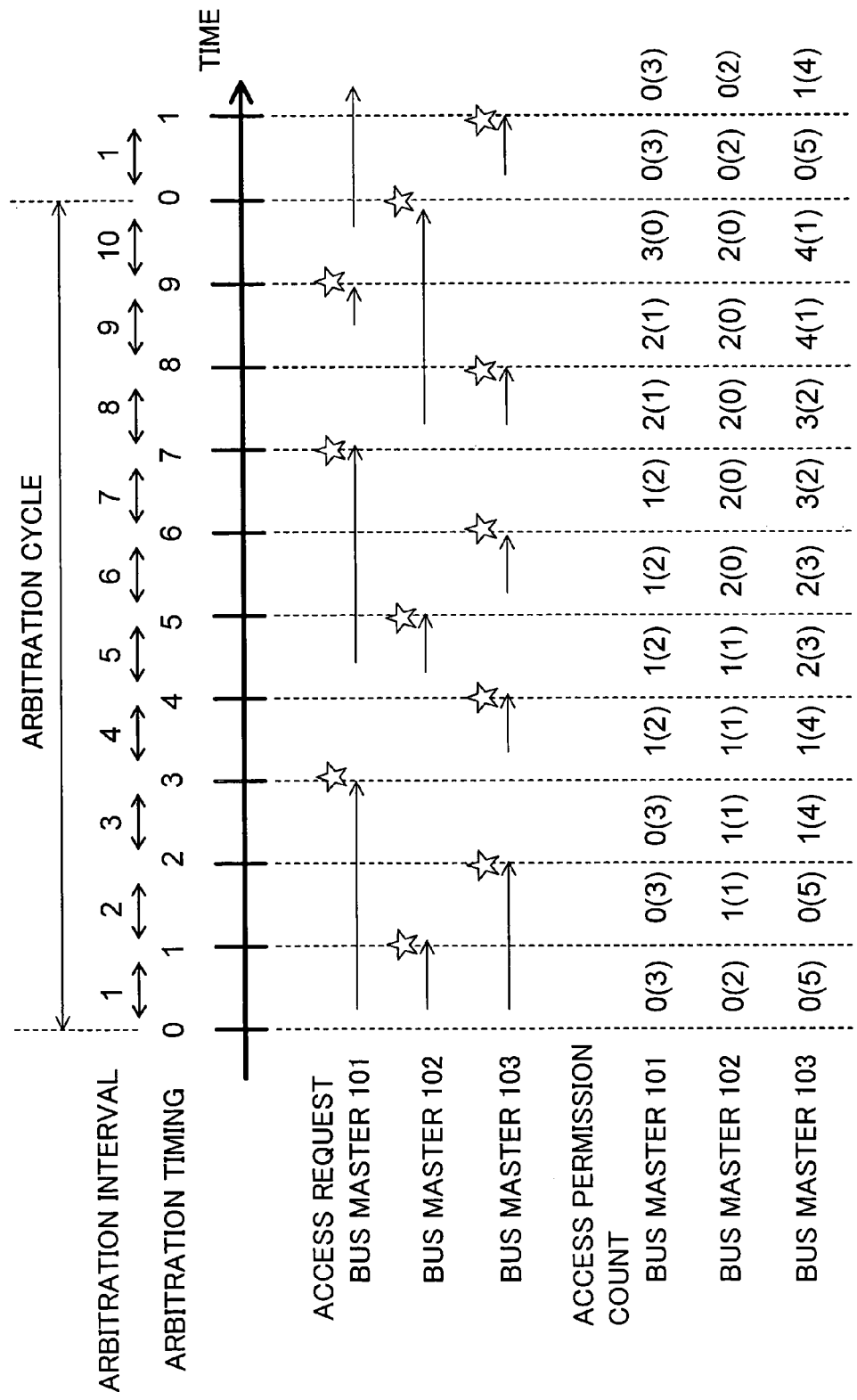
FIG. 5 is a timing diagram showing a third example of arbitration based on the bus arbitration information in FIG. 2.
Figure 6:
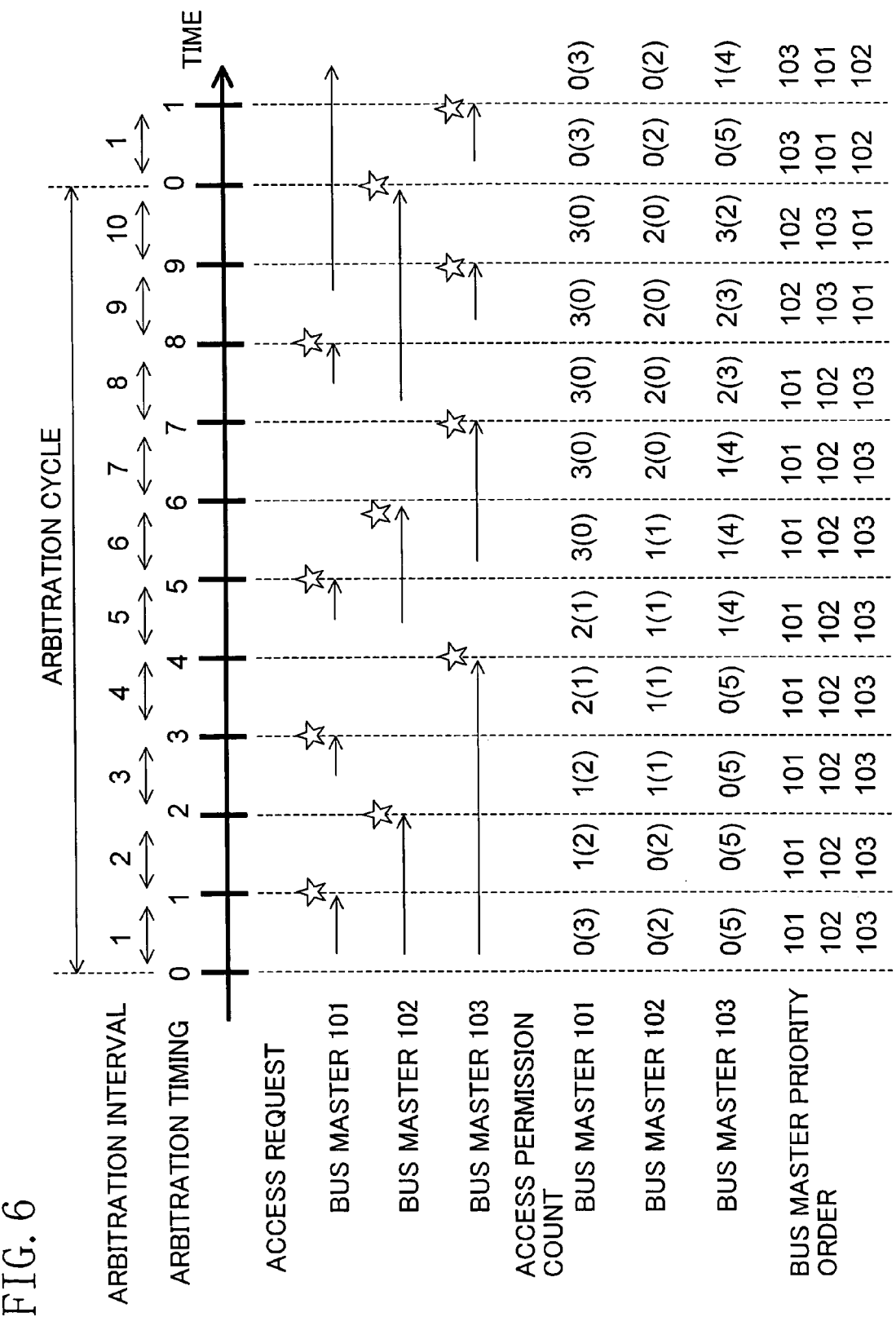
FIG. 6 is a timing diagram showing a fourth example of arbitration based on the bus arbitration information in FIG. 2.

Out of the first through third bus masters 101 through 103, if only a plurality of bus masters associated with the remaining priority permission counts which have already reached zero issue access requests at the same time, the bus arbitration section 104 arbitrates the access requests from these bus masters according to a second priority rule. FIGS. 5 and 6 show examples of such arbitration.

FIG. 5 shows a third example of arbitration based on the bus arbitration information 106 in FIG. 2. In this example, a rule based on the fixed priority order information 223 shown in FIG. 2 is employed as the second priority rule mentioned above. At arbitration timings 1 through 8 in FIG. 5, arbitration is performed in exactly the same manner as that shown in FIG. 3. At arbitration timing 9 in FIG. 5, the first bus master 101 and the second bus master 102 issue access requests. The access permission count 222 associated with the second bus master 102 has reached the count maximum value 221 and the access permission count 222 associated with the first bus master 101 is less than the count maximum value 221, so that the bus arbitration section 104 gives access permission to the first bus master 101. The bus-arbitration-information management section 105 increments the access permission count 222 associated with the first bus master 101 by one. At the last arbitration timing 0 in one arbitration cycle, the first bus master 101 and the second bus master 102 issue access requests. None of these access request masters is associated with the access permission count 222 which does not reach the count maximum value 221 and, in addition, the access permission counts 222 associated with both of the access request masters have reached the count maximum values 221, so that the second bus master 102 gains access permission according the fixed priority order information 223. When arbitration at this arbitration timing 0 is completed, the access permission counts 222 are reset to zero, and one cycle of arbitration is completed. Hereinafter, similar arbitration is performed periodically.

FIG. 6 shows a fourth example of arbitration based on the bus arbitration information 106 in FIG. 2. In this example, the fixed priority order information 223 defining the first priority rule and shown in FIG. 2 indicates that priorities are assigned to the first bus master 101, the second bus master 102 and the third bus master 103 in this order. In addition, a rule of round robin scheduling in which the priorities of the first through third bus masters 101 through 103 are sequentially changed is employed as the second priority rule. The bottom part of FIG. 6 shows the change in the priority order information 223.

At the arbitration timings 1 through 7 in FIG. 6, arbitration is performed in the same manner as in FIG. 3. At arbitration timing 8 in FIG. 6, the first bus master 101 and the second bus master 102 issue access requests. None of these access request masters is associated with the access permission count 222 less than the count maximum value 221 and, in addition, the access permission counts 222 associated with both of the access request masters have reached the count maximum values 221. Accordingly, the first bus master 101 having high priority at this time gains access permission. The bus-arbitration-information management section 105 does not increment the access permission count 222 associated with the first bus master 101, and switches the priority order information 223 according to the round robin scheduling. As a result, priorities are assigned to the second bus master 102, the third bus master 103 and the first bus master 101 in this order. Then, at arbitration timing 9, all the first through third bus masters 101 through 103 issue access requests. At this arbitration timing 9, the access permission counts 222 associated with the first bus master 101 and the second bus master 102 have reached the count maximum values 221 and the access permission count 222 associated with the third bus master 103 is less than the count maximum value 221, so that the bus arbitration section 104 gives access permission to the third bus master 103. The bus-arbitration-information management section 105 increments the access permission count 222 associated with the third bus master 103 by one. It should be noted that the priority order information 223 remains unchanged because the first priority rule based on the fixed priority order information 223 is employed. At the last arbitration timing 0 in one arbitration cycle, the first bus master 101 and the second bus master 102 issue access requests. None of these access request masters is associated with the access permission count 222 less than the count maximum value 221 and, in addition, the access permission counts 222 associated with both of the access request masters have reached the count maximum values 221. Accordingly, the second bus master 102 having high priority at this time gains access permission. When arbitration at this arbitration timing 0 is completed, the access permission counts 222 are reset to zero, whereas the priority order information 223 is switched according to the round robin scheduling. As a result, one cycle of arbitration is completed in a state in which priorities are assigned to the third bus master 103, the first bus master 101 and the second bus master 102 in this order. Hereinafter, similar arbitration is performed periodically.

As described above, in the examples of FIGS. 5 and 6, access permission is given to a bus master associated with a remaining priority permission count which is zero as long an access request is not issued from a bus master associated with a remaining priority permission count which is not zero. Accordingly, the access bandwidth to the shared resource 109 in the entire data processing system 100 is enhanced.

The second priority rule for arbitration in which access permission is given to a bus master associated with a remaining priority permission count which is zero is not limited to a rule based on the fixed priority order information 223 as shown in FIG. 5 or a rule of round robin scheduling as shown in FIG. 6, and any other rule may be employed. Alternatively, priority order information which is prepared separately from the priority order information 223 for use in the first priority rule may be used as the second priority rule.

EMBODIMENT 2

Figure 7:
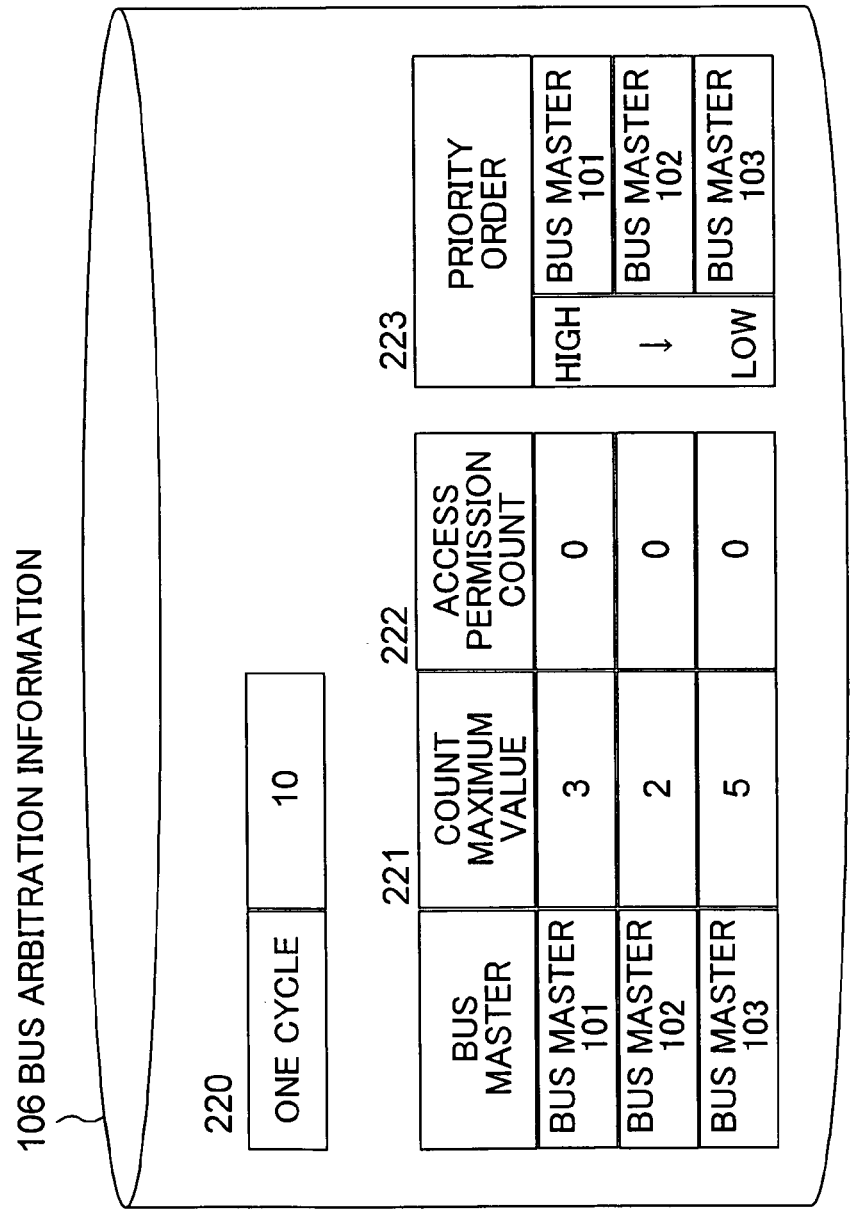
FIG. 7 is a conceptual view showing a second example of the bus arbitration information in FIG. 1.

FIG. 7 shows a second example of the bus arbitration information 106 in FIG. 1. Priority order information 223 shown in FIG. 7 indicates that the priority of bus masters decreases toward the bottom of the list. It is also indicated that management with round robin scheduling is performed in such a manner that the bus-arbitration-information management section 105 rotates the priority order information 223 at every arbitration timing, and the bus master having the highest priority is sequentially switched to the first bus master 101, the second bus master 102 and then the third bus master 103 at respective arbitration timings.

Figure 8:
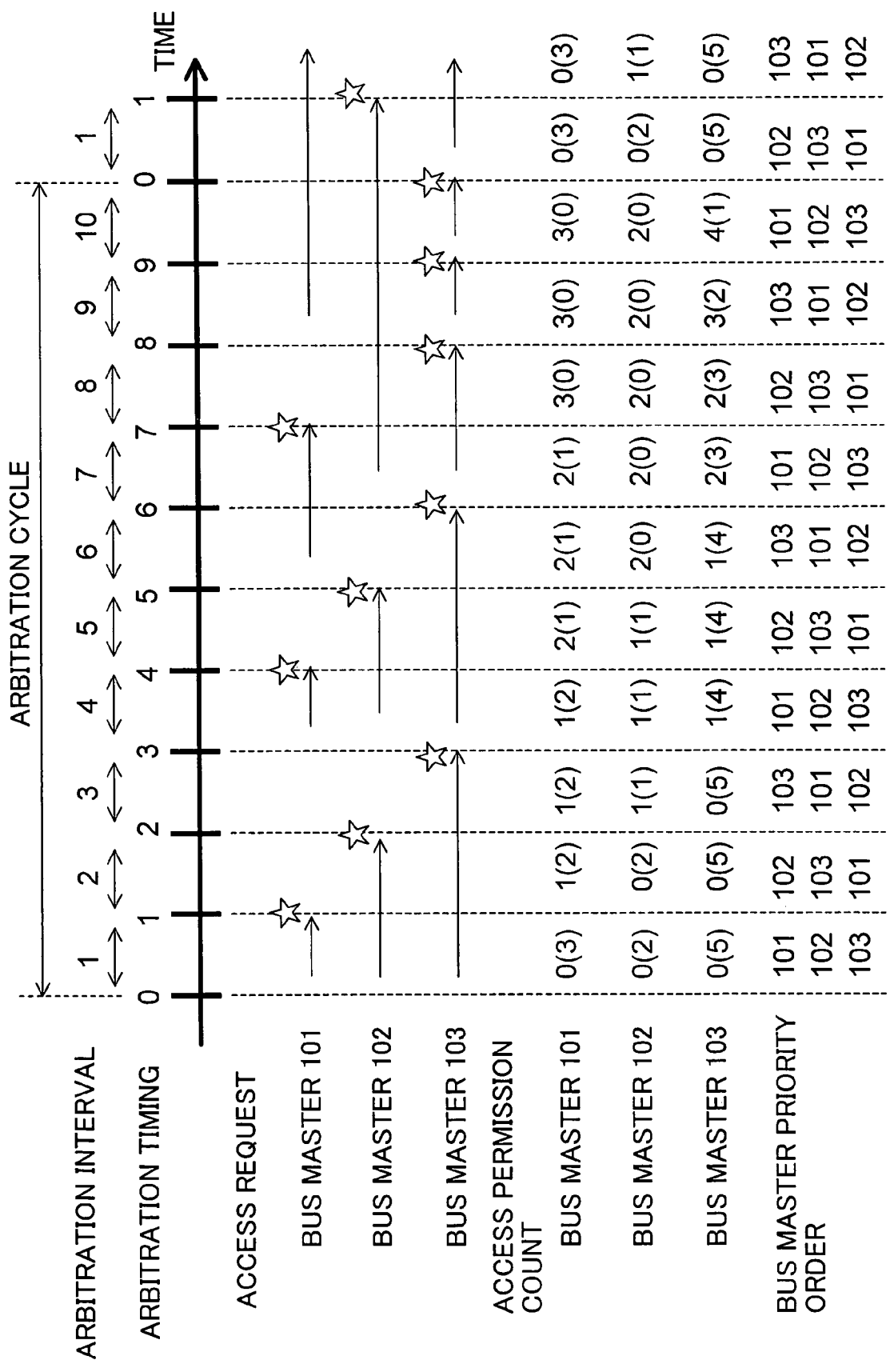
FIG. 8 is a timing diagram showing an example of arbitration based on the bus arbitration information in FIG. 7.

FIG. 8 shows an example of arbitration based on bus arbitration information 106 in FIG. 7. The bottom part of FIG. 8 shows a change in the priority order information 223.

In the example of FIG. 8, at arbitration timing 1, all the first through third bus masters 101 through 103 issue access requests. At this arbitration timing 1, access permission counts 222 associated with all the bus masters are zero and less than the respective count maximum values 221, so that arbitration is performed on all the bus masters based on the priority order information 223. As a result, the first bus master 101 having the highest priority gains access permission. When the bus arbitration section 104 gives access permission to the first bus master 101, the bus-arbitration-information management section 105 increments the access permission count 222 associated with the first bus master 101 by one. Then, the priority order information 223 is rotated. At next arbitration timing 2, the second bus master 102 and the third bus master 103 issue access requests and the access permission counts 222 associated with these bus masters are less than the count maximum values 221, as at the arbitration timing 1, so that arbitration is performed on both of the bus masters based on the priority order information 223. As a result, the second bus master 102 gains access permission. The bus-arbitration-information management section 105 increments the access permission count 222 associated with the second bus master 102 by one. Then, the priority order information 223 is rotated. Then, at arbitration timing 3, only the third bus master 103 issues an access request, so that the bus arbitration section 104 gives access permission to the third bus master 103 and the bus-arbitration-information management section 105 increments the access permission count 222 associated with the third bus master 103 by one. Then, the priority order information 223 is rotated. Thereafter, at arbitration timings 4, 5, 6 and 7, arbitration is performed in the same manner. At arbitration timing 8, the second bus master 102 and the third bus master 103 issue access requests. The access permission count 222 associated with the second bus master 102 has reached the count maximum value 221 and the access permission count 222 associated with the third bus master 103 is less than the count maximum value 221, so that the bus arbitration section 104 gives access permission to the third bus master 103. The bus-arbitration-information management section 105 increments the access permission count 222 associated with the third bus master 103 by one. Then, the priority order information 223 is rotated. Thereafter, arbitration is performed in the same manner and, when arbitration at arbitration timing 0 is completed, the access permission counts 222 are reset to zero and one cycle of arbitration is completed. Hereinafter, similar arbitration is performed periodically.

As described above, in the example of FIGS. 7 and 8, priority is equally allocated to bus masters by round robin scheduling, so that each of the bus masters exhibits average response performance.

The order of rotation of the priority order information 223 by round robin scheduling is not limited to the example of FIG. 8.

EMBODIMENT 3

Figure 9:
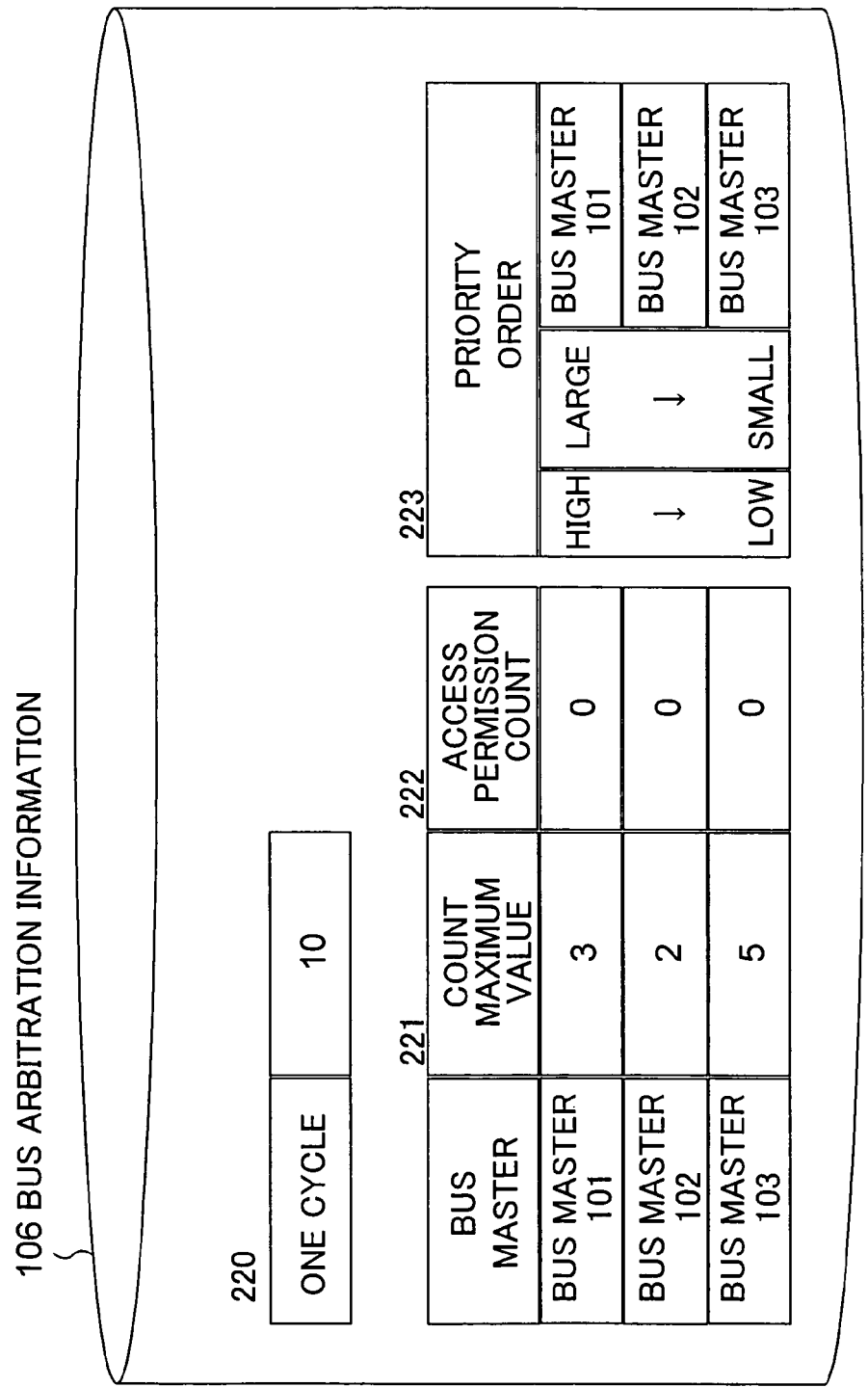
FIG. 9 is a conceptual view showing a third example of bus arbitration information in FIG. 1.

FIG. 9 shows a third example of the bus arbitration information 106 in FIG. 1. Priority order information 223 shown in FIG. 9 indicates that the larger a remaining priority permission count determined from the count maximum value 221 and the access permission count 222 is, the higher the priority is. If the remaining priority permission counts are the same, priorities are assigned to the first bus master 101, the second bus master 102 and the third bus master 103 in this order (i.e., a fixed priority order).

Figure 10:
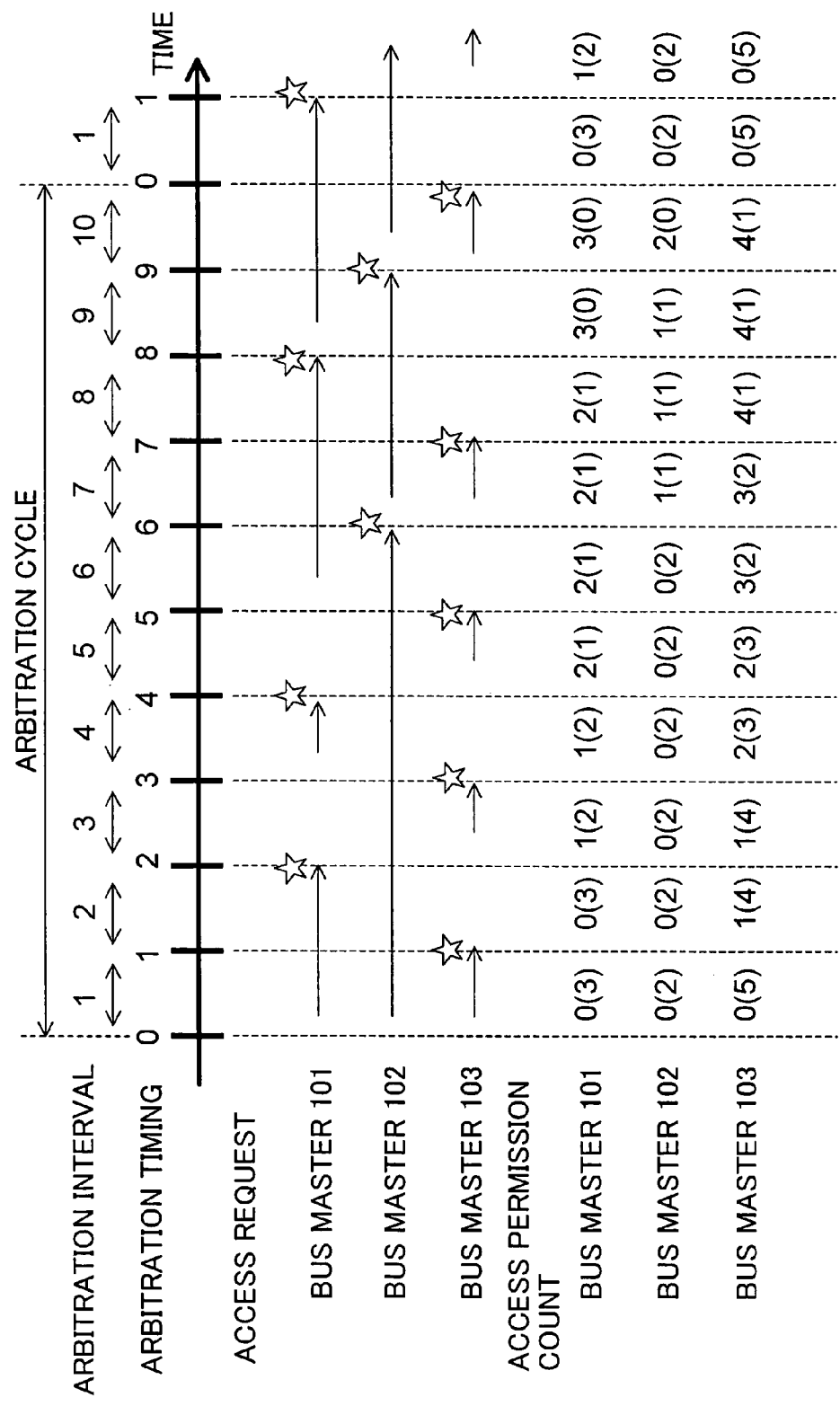
FIG. 10 is a timing diagram showing a first example of arbitration based on the bus arbitration information in FIG. 9.

FIG. 10 shows a first example of arbitration based on the bus arbitration information 106 in FIG. 9. In the example of FIG. 10, at arbitration timing 1, all the first through third bus masters 101 through 103 issue access requests. At this arbitration timing 1, the access permission counts 222 associated with all the bus masters are zero and less than the respective count maximum values 221, so that arbitration is performed on all the bus masters based on the priority order information 223. As a result, the third bus master 103 having the largest remaining priority permission count gains access permission. When the bus arbitration section 104 gives access permission to the third bus master 103, the bus-arbitration-information management section 105 increments the access permission count 222 associated with the third bus master 103 by one. At next arbitration timing 2, the first bus master 101 and the second bus master 102 issue access requests and the access permission counts 222 associated with these bus masters are less than the count maximum values 221, as at the arbitration timing 1, so that arbitration is performed on both of the bus masters based on the priority order information 223. As a result, the first bus master 101 associated with a larger remaining priority permission count gains access permission. The bus-arbitration-information management section 105 increments the access permission count 222 associated with the first bus master 101 by one. Then, at arbitration timing 3, the second bus master 102 and the third bus master 103 issue access requests, so that the third bus master 103 associated with a larger remaining priority permission count gains access permission in the same manner. The bus-arbitration-information management section 105 increments the access permission count 222 associated with the third bus master 103 by one. At arbitration timing 4, the first bus master 101 and the second bus master 102 issue access requests and the access permission counts 222 associated with both of the bus masters are less than the respective count maximum values 221, so that arbitration is performed on these bus musters based on the priority order information 223. In this case, since the remaining priority permission counts associated with these bus masters are the same, the first bus master 101 gains access permission. The bus-arbitration-information management section 105 increments the access permission count 222 associated with the first bus master 101 by one. Thereafter, arbitration is performed in the same manner and, when arbitration at arbitration timing 0 is completed, the access permission counts 222 are reset to zero and one cycle of arbitration is completed. Hereinafter, similar arbitration is performed periodically.

As described above, in the example of FIGS. 9 and 10, the priorities are determined according to the remaining priority permission counts. Accordingly, access permission is allowed to be given early to, for example, a bus master associated with the count maximum value 221 which is set at a large value, so that concentration of access permissions in the latter half of a cycle is avoided. Accordingly, accesses to the shared resource 109 are performed with sufficient time.

The priority order information 223 may be set such that the priority increases as the remaining priority permission count decreases. If the remaining priority permission counts are the same, the priorities may be set at an arbitrary fixed order or may be set by using round robin scheduling or by any other method.

Figure 11:
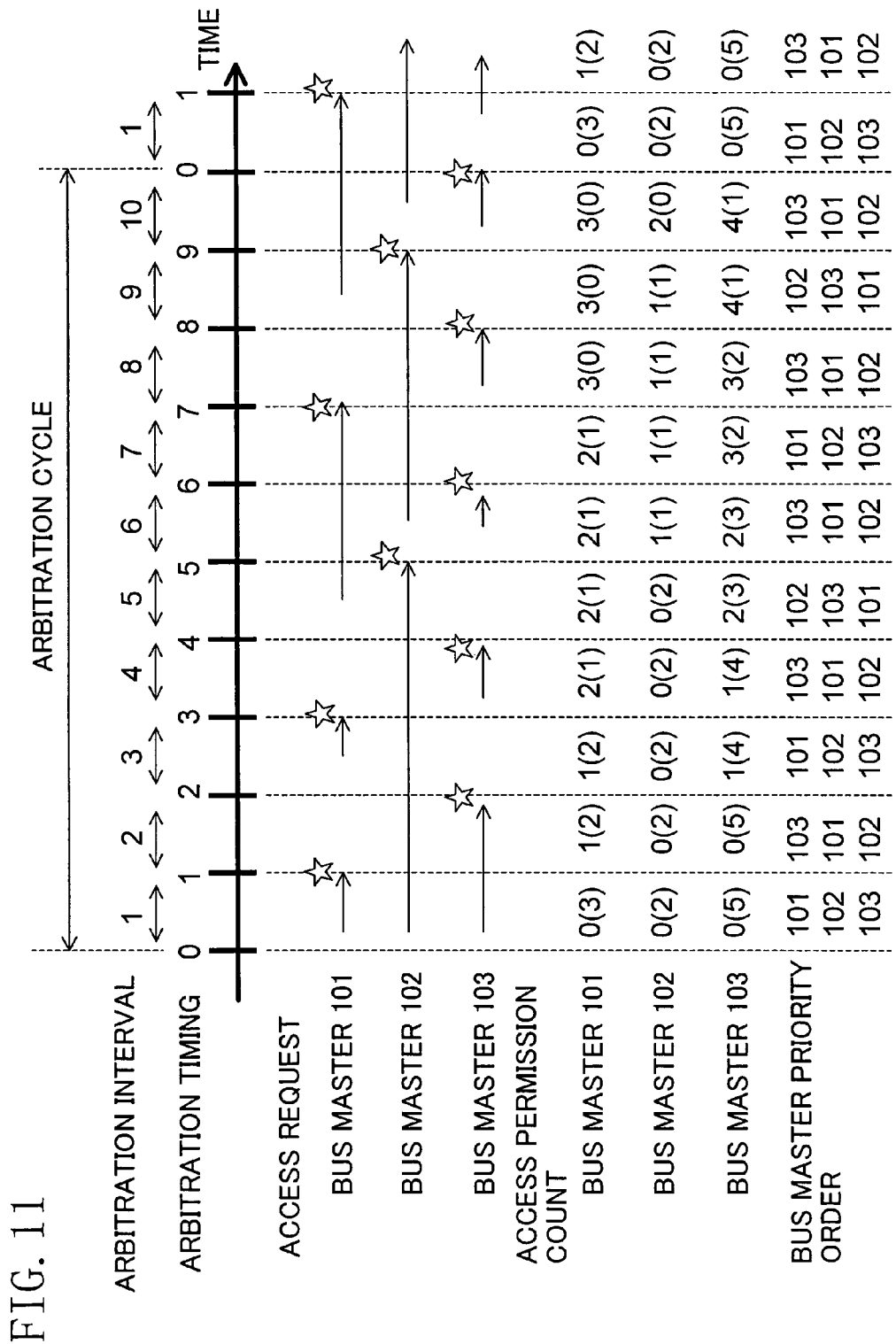
FIG. 11 is a timing diagram showing a second example of arbitration based on the bus arbitration information in FIG. 9.

FIG. 11 shows a second example of arbitration based on the bus arbitration information 106 shown in FIG. 9. In this example, the bus-arbitration-information management section 105 sequentially updates the priority order information 223 such that a bus master associated with the largest remaining priority permission count except for a bus master which gained access permission in current arbitration out of the first through third bus masters 101 through 103 is assigned the highest priority. If the remaining priority permission counts are the same, the first bus master 101 has priority over the second and third bus masters 102 and 103 and the second bus master 102 has priority over the third bus master 103. At next arbitration, bus masters having the second and third highest priorities are cyclically determined with the bus master having the highest priority used as the start point. Specifically, when the first bus master 101 has the highest priority, the second bus master 102 has the second highest priority and the third bus master 103 has the lowest priority. When the second bus master 102 has the highest priority, the third bus master 103 has the second highest priority and the first bus master 101 has the lowest priority. When the third bus master 103 has the highest priority, the first bus master 101 has the second highest priority and the second bus master 102 has the lowest priority.

The bottom part of FIG. 11 shows a change in the priority order information 223. In the initial state of the priority order information 223, priorities are assigned to the first bus master 101, the second bus master 102 and the third bus master 103 in this order.

In the example of FIG. 11, at arbitration timing 1, all the first through third bus masters 101 through 103 issue access requests. At this arbitration timing 1, the access permission counts 222 associated with all the bus masters are zero and less than the respective count maximum values 221, so that arbitration is performed on all the bus masters based on the priority order information 223. As a result, the first bus master 101 having the highest priority in the initial state gains access permission. When the bus arbitration section 104 gives access permission to the first bus master 101, the bus-arbitration-information management section 105 increments the access permission count 222 associated with the first bus master 101 by one and updates the priority order information 223. At this time, except for the first bus master 101 that gained access permission, the third bus master 103 associated with a larger remaining priority permission count has the highest priority out of the second and third bus masters 102 and 103. As a result, priorities are assigned to the third bus master 103, the first bus master 101 and the second bus master 102 in this order. At next arbitration timing 2, the second bus master 102 and the third bus master 103 issue access requests and the access permission counts 222 associated with these bus masters are less than the count maximum values 221, as at the arbitration timing 1, so that arbitration is performed on both of the bus masters based on the priority order information 223. As a result, the third bus master 103 gains access permission. The bus-arbitration-information management section 105 increments the access permission count 222 associated with the third bus master 103 by one and updates the priority order information 223. At this time, the remaining priority permission counts associated with the first and second bus masters 101 and 102 except for the third bus master 103 that gained access permission are both two (i.e., are the same), so that the first bus master 101 has the highest priority according to the predetermined fixed priority order. As a result, the priority order information 223 indicates that priorities are assigned to the first bus master 101, the second bus master 102 and the third bus master 103 in this order. Thereafter, arbitration is performed in the same manner and, at the last arbitration timing 0 in a cycle, the third bus master 103 gains access permission. When arbitration at this arbitration timing 0 is completed, the access permission counts 222 are reset to zero and the priority order information 223 is updated. As a result, one cycle of arbitration is completed in a state in which priorities are assigned to the first bus master 101, the second bus master 102 and the third bus master 103 in this order. Hereinafter, similar arbitration is performed periodically.

As described above, in the example of FIG. 11, priority is equally allocated to all the bus masters, so that each of the bus masters exhibits average response performance.

The order of rotation of the priority order information 223 is not limited to the example of FIG. 11. The priority order information 223 may be set such that a bus master associated with a smaller remaining priority permission count has higher priority. If the remaining priority permission counts are the same, the priorities may be set at an arbitrary fixed order or may be set by using round robin scheduling or by any other method.

Figure 12:
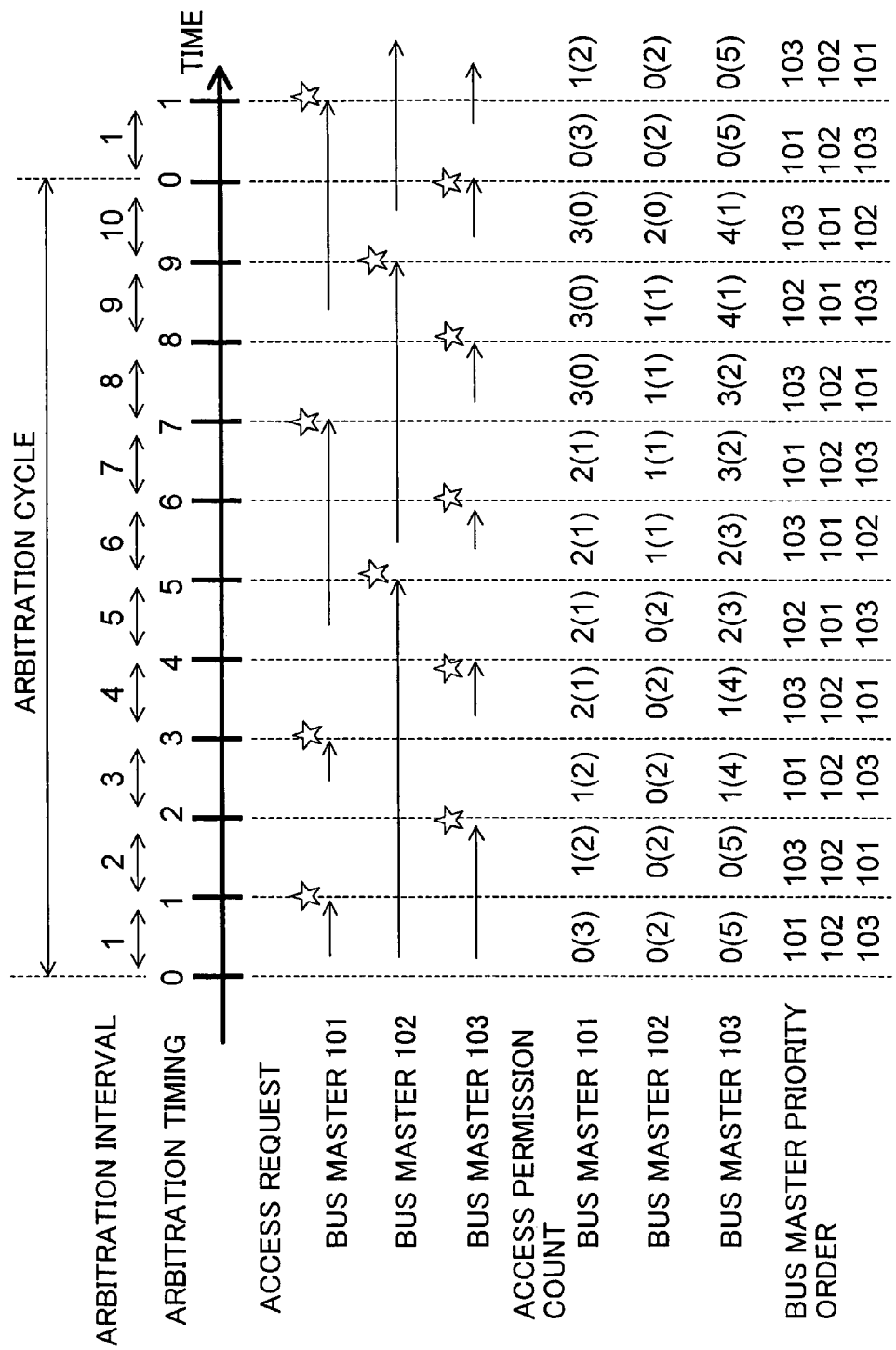
FIG. 12 is a timing diagram showing a third example of arbitration based on the bus arbitration information in FIG. 9.

FIG. 12 shows a third example of arbitration based on the bus arbitration information 106 shown in FIG. 9. In this example, the bus-arbitration-information management section 105 sequentially updates the priority order information 223 such that one of the first through third bus masters 101 through 103 which gained access permission in current arbitration has the lowest priority in next arbitration and, in this next arbitration, priority of the other masters decreases as their remaining priority permission counts decreases. If the remaining priority permission counts are the same, priorities are assigned to the first bus master 101, the second bus master 102 and the third bus master 103 in this order (i.e., a fixed priority order).

The bottom part of FIG. 12 shows a change in the priority order information 223. In the initial state of the priority order information 223, priorities are assigned to the first bus master 101, the second bus master 102 and the third bus master 103 in this order.

In the example of FIG. 12, at arbitration timing 1, all the first through third bus masters 101 through 103 issue access requests. At this arbitration timing 1, the access permission counts 222 associated with all the bus masters are zero and less than the respective count maximum values 221, so that arbitration is performed on all the bus masters based on the priority order information 223. As a result, the first bus master 101 having the highest priority gains access permission. When the bus arbitration section 104 gives access permission to the first bus master 101, the bus-arbitration-information management section 105 increments the access permission count 222 associated with the first bus master 101 by one and updates the priority order information 223. At this time, the first bus master 101 that gained access permission has the lowest priority and one of the second and third bus masters 102 and 103 associated with a larger remaining priority permission count has priority over the other. As a result, the priority order information 223 indicates that priorities are assigned to the third bus master 103, the second bus master 102 and the first bus master 101 in this order. At next arbitration timing 2, the second bus master 102 and the third bus master 103 issue access requests and the access permission counts 222 associated with these bus masters are less than the count maximum values 221, as at the arbitration timing 1, so that arbitration is performed on both of the bus masters based on the priority order information 223. As a result, the third bus master 103 gains access permission. The bus-arbitration-information management section 105 increments the access permission count 222 associated with the third bus master 103 by one and updates the priority order information 223. At this time, the third bus master 103 that gained access permission has the lowest priority. The remaining priority permission counts associated with the first and second bus masters 101 and 102 are both two (i.e., are the same), so that the first bus master 101 has the highest priority according to the predetermined fixed priority order. As a result, the priority order information 223 indicates that priorities are assigned to the first bus master 101, the second bus master 102 and the third bus master 103 in this order. Thereafter, arbitration is performed in the same manner and at the last arbitration timing 0 in one arbitration cycle, the third bus master 103 gains access permission. When arbitration at this arbitration timing 0 is completed, the access permission counts 222 are reset to zero and the priority order information 223 is updated. As a result, one cycle of arbitration is completed in a state in which priorities are assigned to the first bus master 101, the second bus master 102 and the third bus master 103 in this order. Hereinafter, similar arbitration is performed periodically.

As described above, in the example of FIG. 12, the priority of a bus master which gained access permission is lowered, so that it is possible to prevent one bus master from gaining access permission consecutively. Accordingly, concentration of access permissions in the first half of a cycle is also avoided.

The priority order information 223 may be set such that a bus master associated with a smaller remaining priority permission count has higher priority. If the remaining priority permission counts are the same, the priorities may be set at an arbitrary fixed order or may be set by using round robin scheduling or by any other method.

Figure 13:
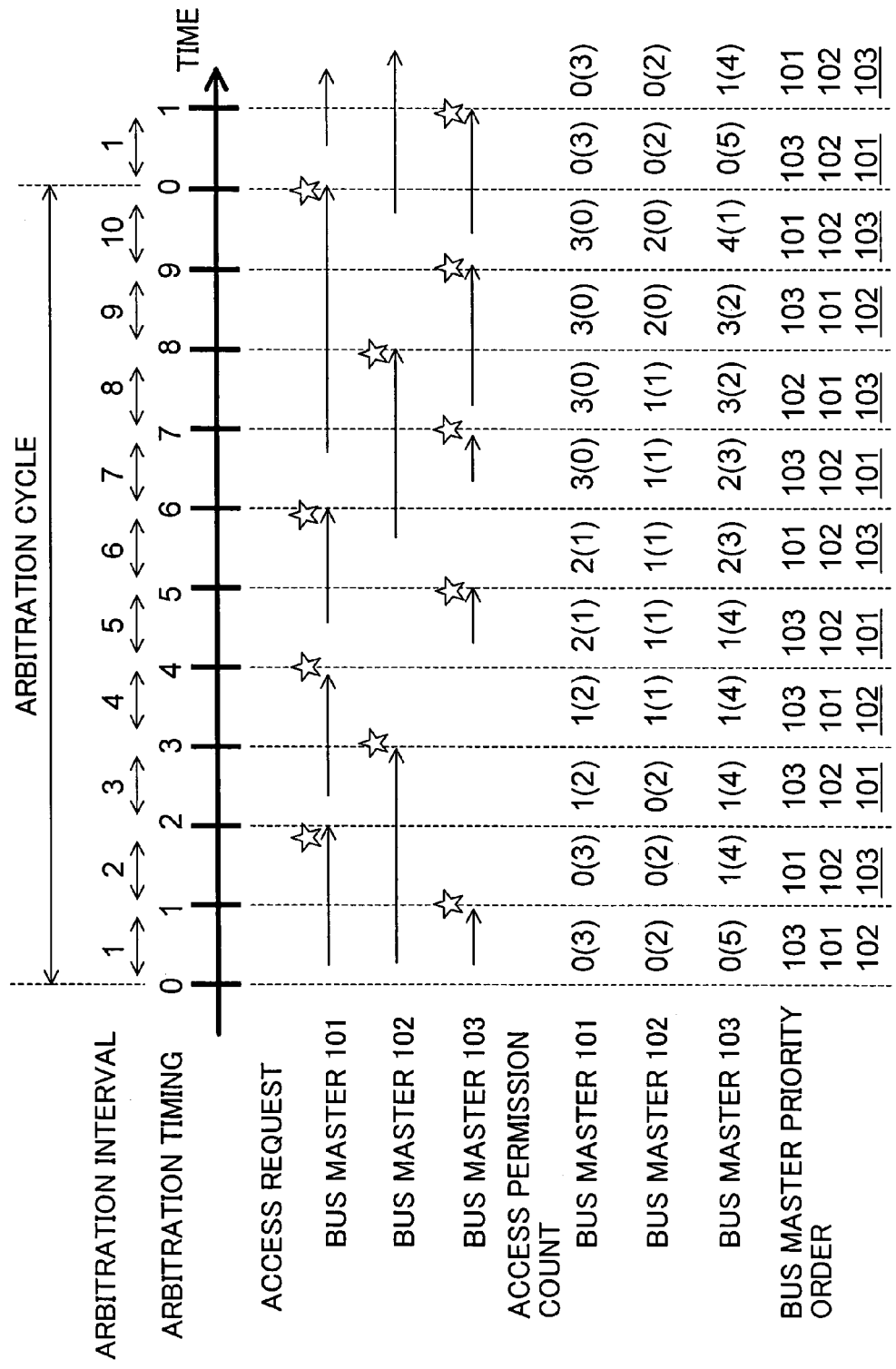
FIG. 13 is a timing diagram showing a fourth example of arbitration based on the bus arbitration information in FIG. 9.

FIG. 13 shows a fourth example of arbitration based on the bus arbitration information 106 in FIG. 9. In this example, the priority order information 223 indicates that a bus master associated with a larger remaining priority permission count has higher priority and, if the remaining priority permission counts are the same, priorities are assigned to the first bus master 101, the second bus master 102 and the third bus master 103 in this order (i.e., a fixed priority order). It should be noted that one of the first through third bus masters 101, 102 and 103 which gained access permission at current arbitration is removed from candidates for access permission in next arbitration by the bus-arbitration-information management section 105.

The bottom part of FIG. 13 shows a change in the priority order information 223. The underlines indicate bus masters removed from access permission candidates.

In the example of FIG. 13, at arbitration timing 1, all the first through third bus masters 101 through 103 issue access requests. At this arbitration timing 1, the access permission counts 222 associated with all the bus masters are zero and less than the respective count maximum values 221, so that arbitration is performed on all the bus masters based on the priority order information 223. As a result, the third bus master 103 associated with the largest remaining priority permission count gains access permission. When the bus arbitration section 104 gives access permission to the third bus master 103, the bus-arbitration-information management section 105 increments the access permission count 222 associated with the third bus master 103 by one and performs control such that the third bus master 103 is removed from candidates for access permission in the next arbitration timing. At next arbitration timing 2, the first bus master 101 and the second bus master 102 issue access requests and the access permission counts 222 associated with these bus masters are less than the count maximum values 221, as at the arbitration timing 1, so that arbitration is performed on both of the bus masters based on the priority order information 223. As a result, the first bus master 101 gains access permission. The bus-arbitration-information management section 105 increments the access permission count 222 associated with the first bus master 101 by one and performs control such that the first bus master 101 is removed from candidates for access permission at the next arbitration timing. At arbitration timings 3 through 9, arbitration is performed in the same manner. At the last arbitration timing 0, all the first through third bus masters 101 through 103 issue access requests. At this arbitration timing 0, the access permission count 222 associated with the third bus master 103 is four and is less than the count maximum value 221. However, since the third bus master 103 has been already removed from access permission candidates, so that the third bus master 103 cannot gain access permission. As a result, at the arbitration timing 0, out of the first and second bus masters 101 and 102, the first bus master 101 gains access permission according to the fixed priority order. When arbitration at this arbitration timing 0 is completed, the access permission counts 222 are reset to zero and one cycle of arbitration is completed. Hereinafter, similar arbitration is performed periodically.

As described above, in the example of FIG. 13, access permission is not consecutively given to the same bus master, so that concentration of access permissions to the same bus master is avoided.

The priority order information 223 may be set such that a bus master associated with a smaller remaining priority permission count has higher priority. If the remaining priority permission counts are the same, the priorities may be set at an arbitrary fixed order or may be set by using round robin scheduling or by any other method.

A period during which a bus master is removed from access permission candidates may be arbitrarily set. For example, a master which gained access permission at current arbitration may be removed from access permission candidates in a plurality of subsequent arbitrations. The period during which a bus master is removed from access permission candidates may be determined irrespective of arbitration intervals. The period may also be determined according to the remaining priority permission counts. For example, in a case in which the remaining priority permission count associated with a bus master which gained access permission in current arbitration is X and the sum of the remaining priority permission counts associated with all the bus masters is Y, if the bus master which gained access permission in current arbitration is removed from access permission candidates in arbitrations performed in a number of times obtained by Y/X, concentration of access permission is prevented using the remaining priority permission counts.

Figure 14:
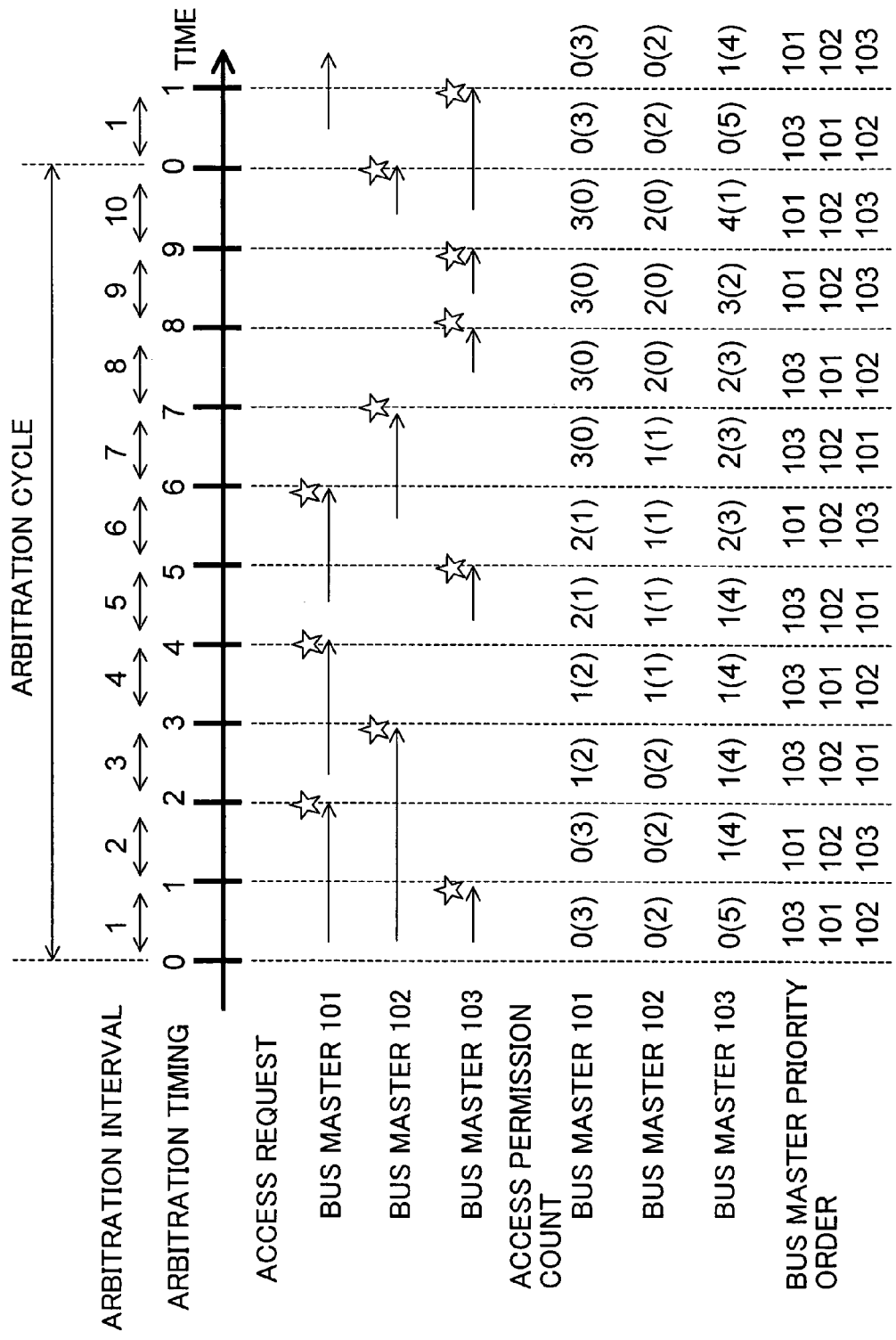
FIG. 14 is a timing diagram showing a fifth example of arbitration based on the bus arbitration information in FIG. 9.

FIG. 14 shows a fifth example of arbitration based on the bus arbitration information 106 in FIG. 9. In this example, the priority order information 223 indicates that a bus master associated with a larger remaining priority permission count has higher priority and, if the remaining priority permission counts are the same, priorities are assigned to the first bus master 101, the second bus master 102 and the third bus master 103 in this order (i.e., a fixed priority order). One of the first through third bus masters 101 through 103 which gained access permission in current arbitration is removed from candidates for access permission in next arbitration by the bus-arbitration-information management section 105. However, the bus master removed from access permission candidates is allowed to gain access permission if the remaining priority permission counts associated with the other bus masters as the access permission candidates have already reached zero and none of the other bus masters as the access permission candidates issues an access request.

In the example of FIG. 14, at arbitration timing 1, all the first through third bus masters 101 through 103 issue access requests. At this arbitration timing 1, the access permission counts 222 associated with all the bus masters are zero and less than the respective count maximum values 221, so that arbitration is performed on all the bus masters based on the priority order information 223. As a result, the third bus master 103 associated with the largest remaining priority permission count gains access permission. When the bus arbitration section 104 gives access permission to the third bus master 103, the bus-arbitration-information management section 105 increments the access permission count 222 associated with the third bus master 103 by one and performs control such that the third bus master 103 is removed from access permission candidates in the next arbitration timing as a general rule but has the lowest priority under certain conditions. At next arbitration timing 2, the first bus master 101 and the second bus master 102 issue access requests and the access permission counts 222 associated with these bus masters are less than the count maximum values 221, as at the arbitration timing 1, so that arbitration is performed on both of the bus masters based on the priority order information 223. As a result, the first bus master 101 gains access permission. The bus-arbitration-information management section 105 increments the access permission count 222 associated with the first bus master 101 by one and performs control such that the first bus master 101 is removed from access permission candidates at the next arbitration timing as a general rule but has the lowest priority under certain conditions. At arbitration timings 3 through 8, arbitration is performed in the same manner. Then, at arbitration timing 9, only the third bus master 103 issues an access request. At this arbitration timing 9, though the third bus master 103 is removed from access permission candidates as a general rule, the remaining priority permission counts associated with the first and second bus masters 101 and 102 have already reached zero and none of the first and second bus masters 101 and 102 issues an access request. Accordingly, the third bus master 103, which gained access permission at the arbitration timing 8, gains access permission. When the bus arbitration section 104 gives access permission to the third bus master 103, the bus-arbitration-information management section 105 increments the access permission count 222 associated with the third bus master 103 by one and performs control such that the third bus master 103 is removed from access permission candidates at the next arbitration timing as a general rule but has the lowest priority under certain conditions. Thereafter, at arbitration timing 0, the second bus master 102 and the third bus master 103 issue access requests. At this last arbitration timing 0, though the third bus master 103 has been removed from access permission candidates as a general rule and the remaining priority permission counts associated with the first and second bus masters 101 and 102 have already reached zero, the second bus master 102, which is an access permission candidate, issues an access request, so that the third bus master 103 cannot gain access permission and the second bus master 102 gains access permission. When arbitration at this arbitration timing 0 is completed, all the access permission counts 222 are reset to zero and one cycle of arbitration is completed. Hereinafter, similar arbitration is performed periodically.

As described above, in the example of FIG. 14, access permission is consecutively given to the same bus master under certain conditions so that an opportunity for access permission is not missed.

The priority order information 223 may be set such that a bus master associated with a smaller remaining priority permission count has higher priority. If the remaining priority permission counts are the same, the priorities may be set at an arbitrary fixed order or may be set by using round robin scheduling or by any other method. As in the example of FIG. 13, a period during which a bus master is removed from access permission candidates may be arbitrarily determined.

EMBODIMENT 4

Figure 15:
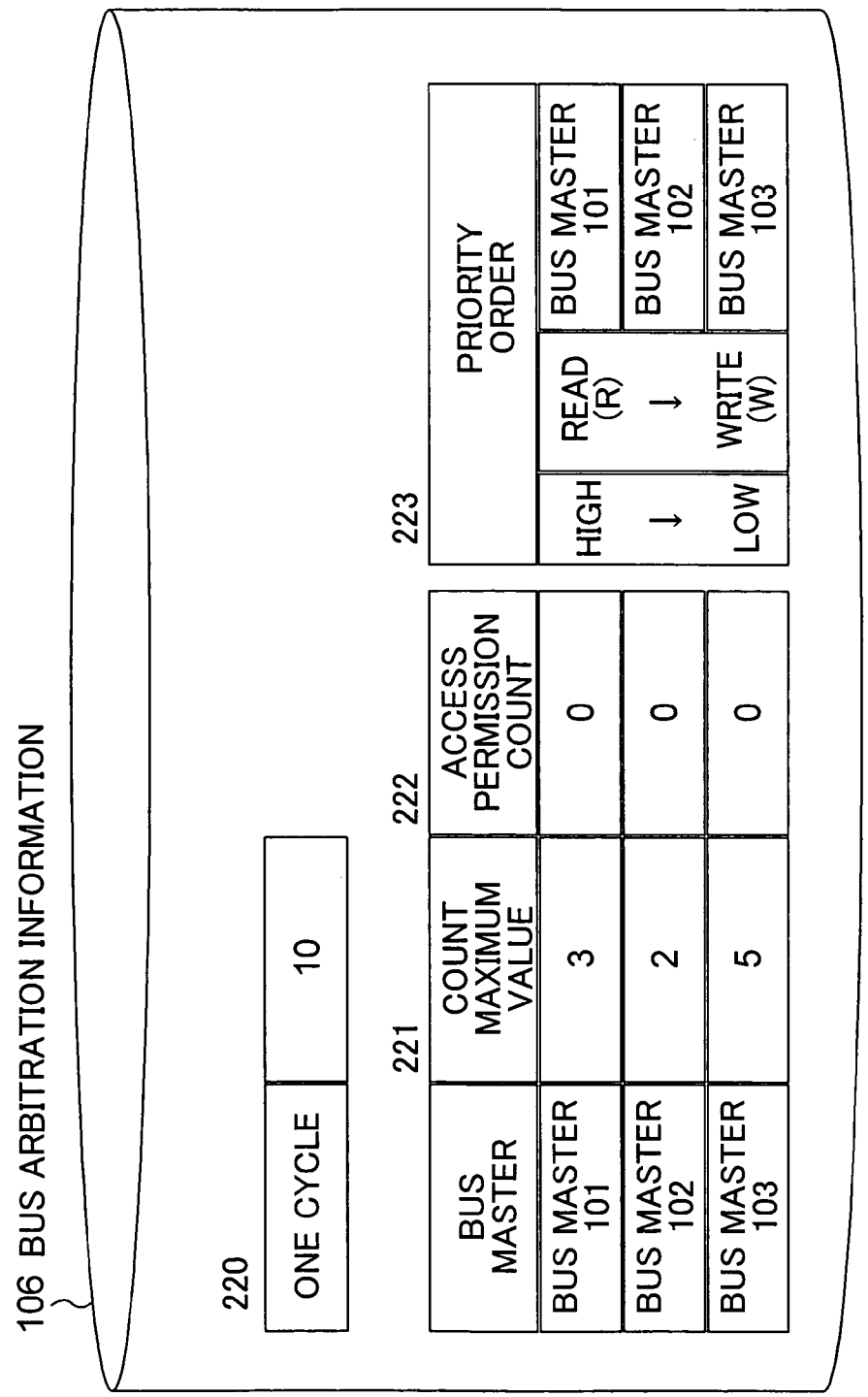
FIG. 15 is a conceptual view showing a fourth example of the bus arbitration information in FIG. 1.

FIG. 15 shows a fourth example of the bus arbitration information 106 in FIG. 1. Priority order information 223 shown in FIG. 15 indicates that an access request for data read transfer has high priority over an access request for data write transfer. It is also indicated that in the case of access requests for the same operation, i.e., read transfer or write transfer, priorities are assigned to a first bus master 101, a second bus master 102 and a third bus master 103 in this order (i.e., a fixed priority order).

Figure 16:
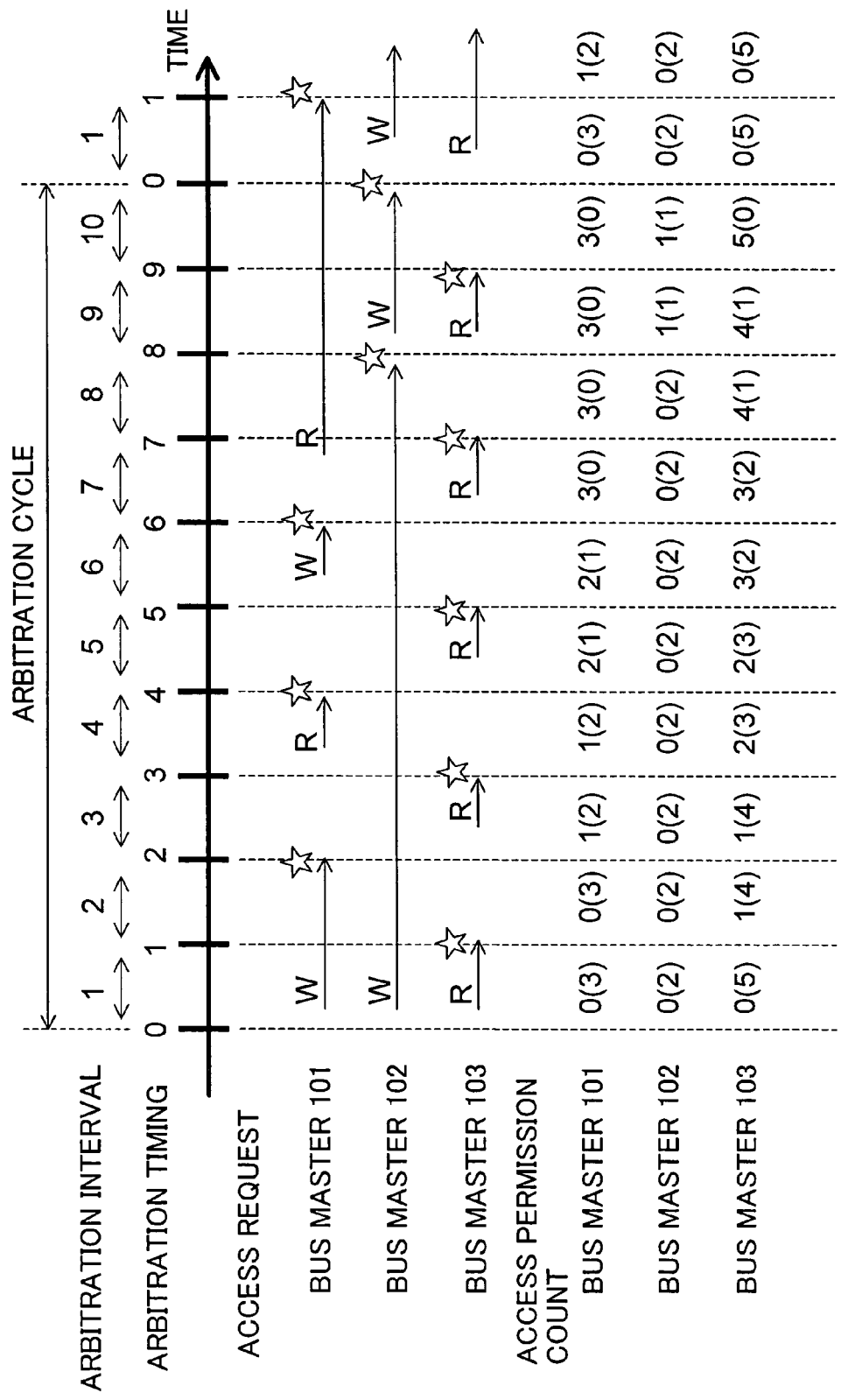
FIG. 16 is a timing diagram showing an example of arbitration based on the bus arbitration information in FIG. 15.

FIG. 16 shows an example of arbitration based on the bus arbitration information 106 shown in FIG. 15. In the middle part of FIG. 16, symbols "W" and "R" attached to arrows indicating access requests represent write transfer and read transfer, respectively.

In the example of FIG. 16, at arbitration timing 1, all the first through third bus masters 101 through 103 issue access requests. At this arbitration timing 1, the access permission counts 222 associated with all the bus masters are zero and less than the respective count maximum values 221, so that arbitration is performed on all the bus masters based on the priority order information 223. As a result, the third bus master 103 for read transfer gains access permission. When the bus arbitration section 104 gives access permission to the third bus master 103, the bus-arbitration-information management section 105 increments the access permission count 222 associated with the third bus master 103 by one. At next arbitration timing 2, the first bus master 101 and the second bus master 102 issue access requests and the access permission counts 222 associated with these bus masters are less than the count maximum values 221, as at the arbitration timing 1, so that arbitration is performed on both of the bus masters based on the priority order information 223. Accordingly, since the first bus master 101 and the second bus master 102 are both for write transfer, the first bus master 101 having higher priority gains access permission. The bus-arbitration-information management section 105 increments the access permission count 222 associated with the first bus master 101 by one. Then, at arbitration timing 3, the second bus master 102 and the third bus master 103 issue access requests, and the third bus master 103, which is for read transfer, gains access permission in the same manner. The bus-arbitration-information management section 105 increments the access permission count 222 associated with the third bus master 103 by one. At arbitration timings 4, 5, 6 and 7, arbitration is performed in the same manner. Then, at arbitration timing 8, the first bus master 101 and the second bus master 102 issue access requests. Since the access permission count 222 associated with the first bus master 101 has reached the count maximum value 221 and the access permission count 222 associated with the second bus master 102 is less than the count maximum value 221, the second bus master 102 gains access permission. The bus-arbitration-information management section 105 increments the access permission count.222 associated with the second bus master 102 by one. Thereafter, arbitration is performed in the same manner and, when arbitration at arbitration timing 0 is completed, the access permission counts 222 are reset to zero and one cycle of arbitration is completed. Hereinafter, similar arbitration is performed periodically.

As described above, in the example of FIGS. 15 and 16, the priority order is determined according to an access mode to the shared resource 109. Accordingly, if read transfer requiring longer response time is assigned priority over write transfer, for example, the response time of the entire data processing system 100 is reduced.

The priority order information 223 may be set such that write transfer has priority over read transfer. Any access mode such as an address to be accessed or the type of burst transmission may be reflected in the priority order information 223. In addition, if the access modes are the same, the priorities may be set at an arbitrary fixed order or may be set by using round robin scheduling or by any other method.

EMBODIMENT 5

Figure 17:
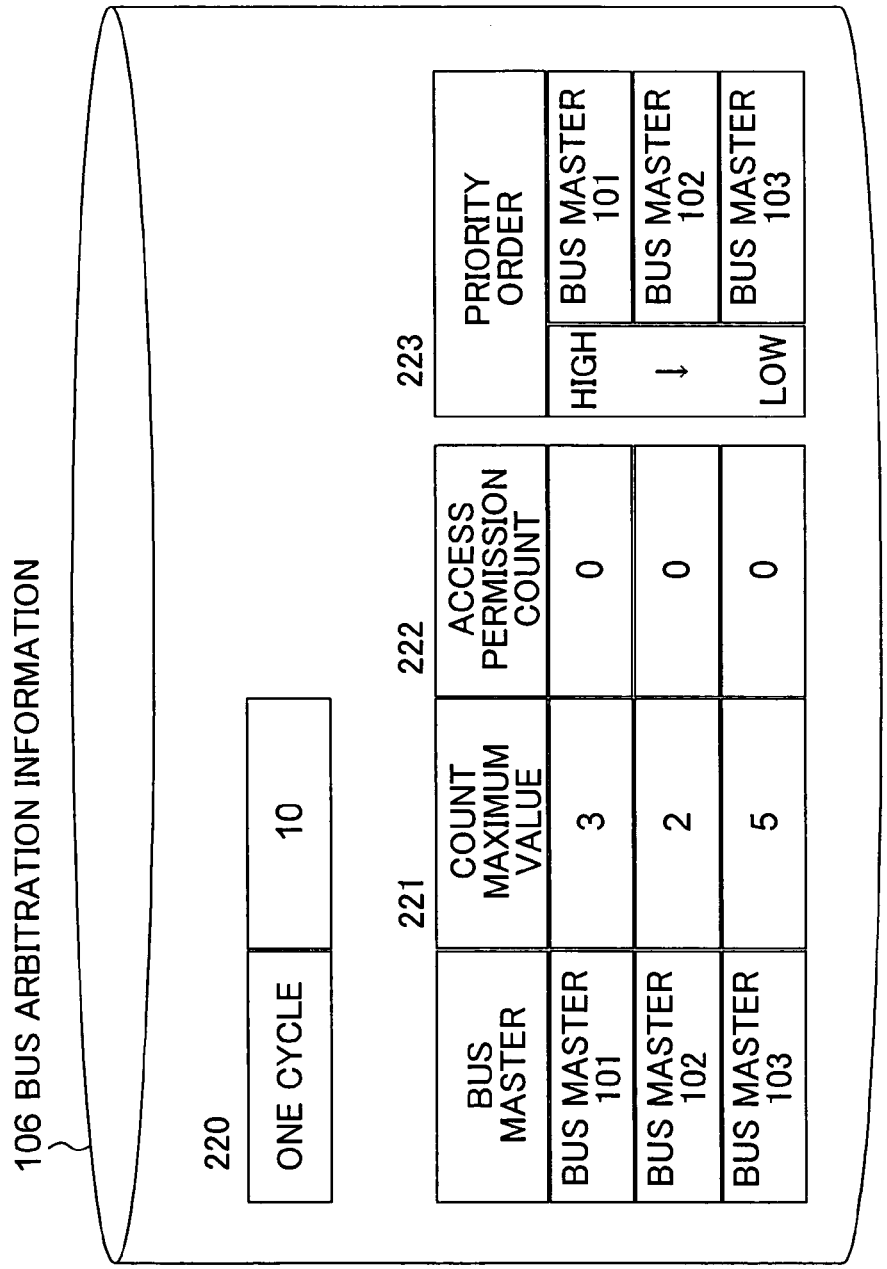
FIG. 17 is a conceptual view showing a fifth example of the bus arbitration information in FIG. 1.

FIG. 17 shows a fifth example of the bus arbitration information 106 shown in FIG. 1. Priority order information 223 shown in FIG. 17 is managed by the bus-arbitration-information management section 105 according to LRU (Least Recently Used) algorithm such that the least recently accessing bus master has the highest priority.

Figure 18:
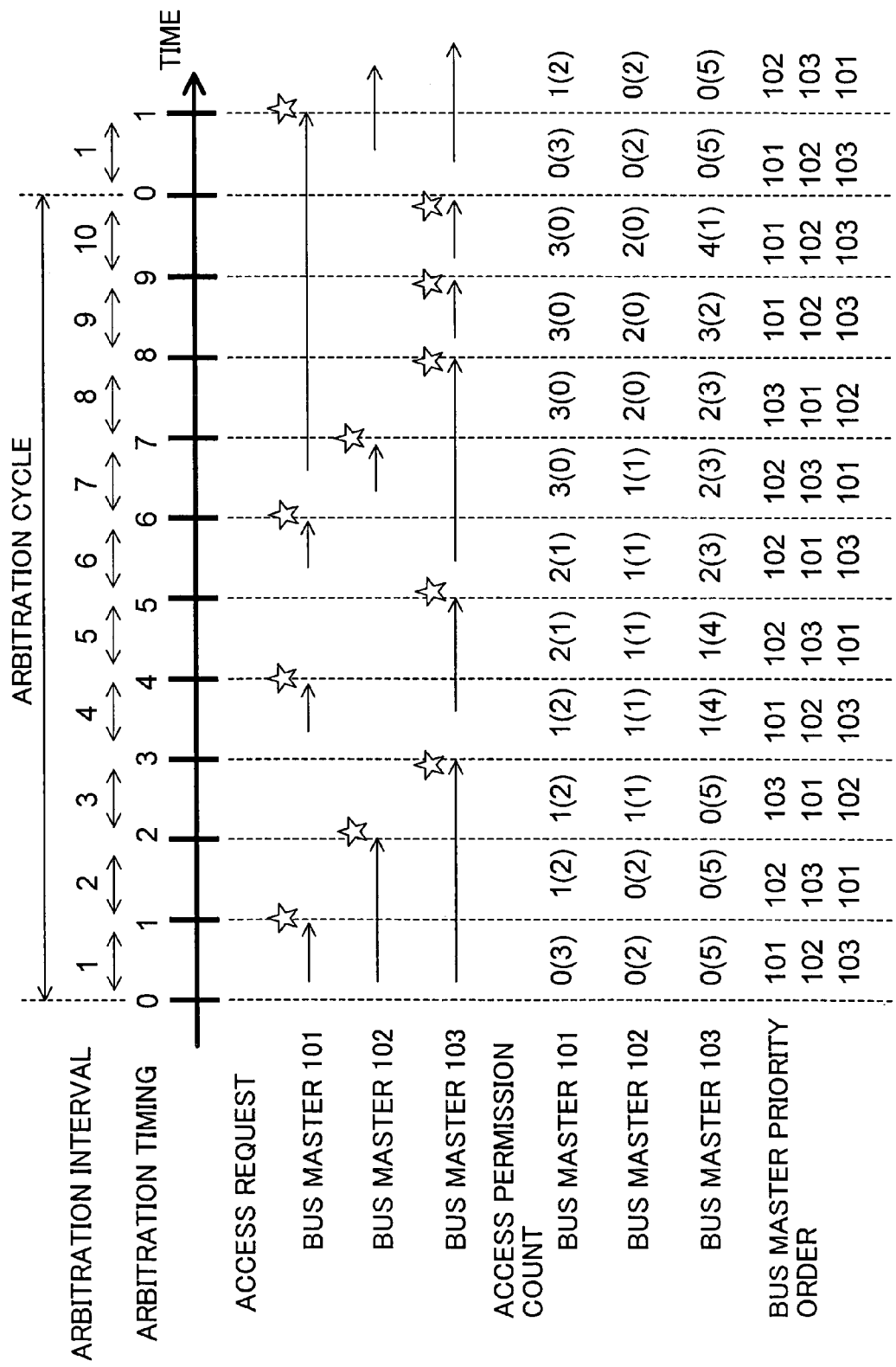
FIG. 18 is a timing diagram showing an example of arbitration based on the bus arbitration information in FIG. 17.

FIG. 18 shows an example of arbitration based on the bus arbitration information 106 in FIG. 17. The bottom part of FIG. 18 shows a change in the priority order information 223.

In the example of FIG. 18, at arbitration timing 1, all the first through third bus masters 101 through 103 issue access requests. At this arbitration timing 1, the access permission counts 222 associated with all the bus masters are zero and less than the respective count maximum values 221, so that arbitration is performed on all the bus masters based on the priority order information 223. As a result, the first bus master 101 gains access permission. When the bus arbitration section 104 gives access permission to the first bus master 101, the bus-arbitration-information management section 105 increments the access permission count 222 associated with the first bus master 101 by one. The bus-arbitration-information management section 105 updates the priority order information 223 such that the first bus master 101 has the lowest priority. At this time, the update is performed such that the priority order between the other two bus masters is not changed. At next arbitration timing 2, the second bus master 102 and the third bus master 103 issue access requests and the access permission counts 222 associated with these bus masters are less than the count maximum values 221, as at the arbitration timing 1, so that arbitration is performed on both of the bus masters based on the priority order information 223. As a result, the second bus master 102 gains access permission. The bus-arbitration-information management section 105 increments the access permission count 222 associated with the second bus master 102 by one. Then, the bus-arbitration-information management section 105 updates the priority order information 223 such that the second bus master 102 has the lowest priority. At this time, the update is performed such that the priority order between the other two bus masters is not changed. Then, at arbitration timing 3, only the third bus master 103 issues an access request, so that the third bus master 103 gains access permission. The bus-arbitration-information management section 105 increments the access permission count 222 associated with the third bus master 103 by one. Then, the bus-arbitration-information management section 105 updates the priority order information 223 such that the third bus master 103 has the lowest priority. At this time, the update is performed such that the priority order between the other two bus masters is not changed. At arbitration timings 4, 5 and 6, arbitration is performed in the same manner. At arbitration timing 7, the first through third bus masters 101 through 103 issue access requests. The access permission count 222 associated with the first bus master 101 has reached the count maximum value 221 and the access permission counts 222 associated with the second bus master 102 and the third bus master 103 are less than the count maximum values 221. Accordingly, as a result of competition between the second and third bus masters 102 and 103, the second bus master 102 gains access permission. The bus-arbitration-information management section 105 increments the access permission count 222 associated with the second bus master 102 by one. Then, the bus-arbitration-information management section 105 updates the priority order information 223 such that the second bus master 102 has the lowest priority. At this time, the update is performed such that the priority order between the other two bus masters is not changed. Thereafter, arbitration is performed in the same manner and, when arbitration at arbitration timing 0 is completed, the access permission counts 222 are reset to zero and one cycle of arbitration is completed. Hereinafter, similar arbitration is performed periodically.

As described above, in the example of FIGS. 17 and 18, the priority order is determined according to LRU algorithm, so that the worst value of response time for each bus master is reduced.

EMBODIMENT 6

Figure 19:
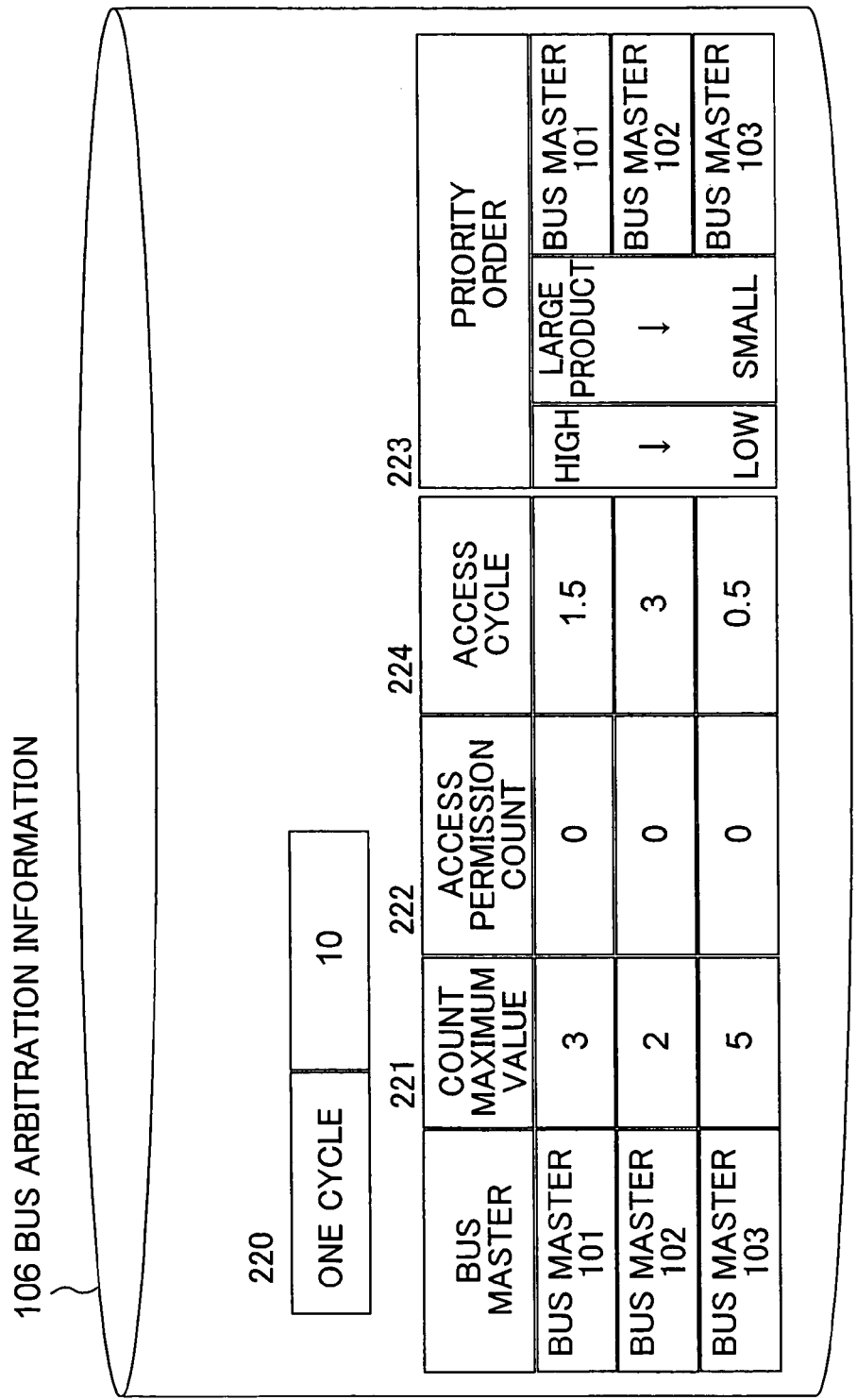
FIG. 19 is a conceptual view showing a sixth example of the bus arbitration information in FIG. 1.

FIG. 19 shows a sixth example of the bus arbitration information 106 shown in FIG. 1. The bus arbitration information 106 in FIG. 19 includes information on access cycles 224 which is set for the respective bus masters, in addition to arbitration cycle information 220, count maximum values 221 which are set for the respective bus masters, access permission counts 222 which are set for the respective bus masters and priority order information 223. When receiving access permission, each of the first through third bus masters 101 through 103 issues a next access request after a lapse of time obtained by multiplying an arbitration interval by a value which is set as an access cycle 224. The priority order information 223 shown in FIG. 19 is managed by the bus-arbitration-information management section 105 such that a bus master for which the product of a remaining priority permission count (which is determined from the count maximum value 221 and the access permission count 222) and the access cycle 224 is larger has higher priority. If the products are the same, priorities are assigned to the first bus master 101, the second bus master 102 and the third bus master 103 in this order (i.e., a fixed priority order).

Figure 20:
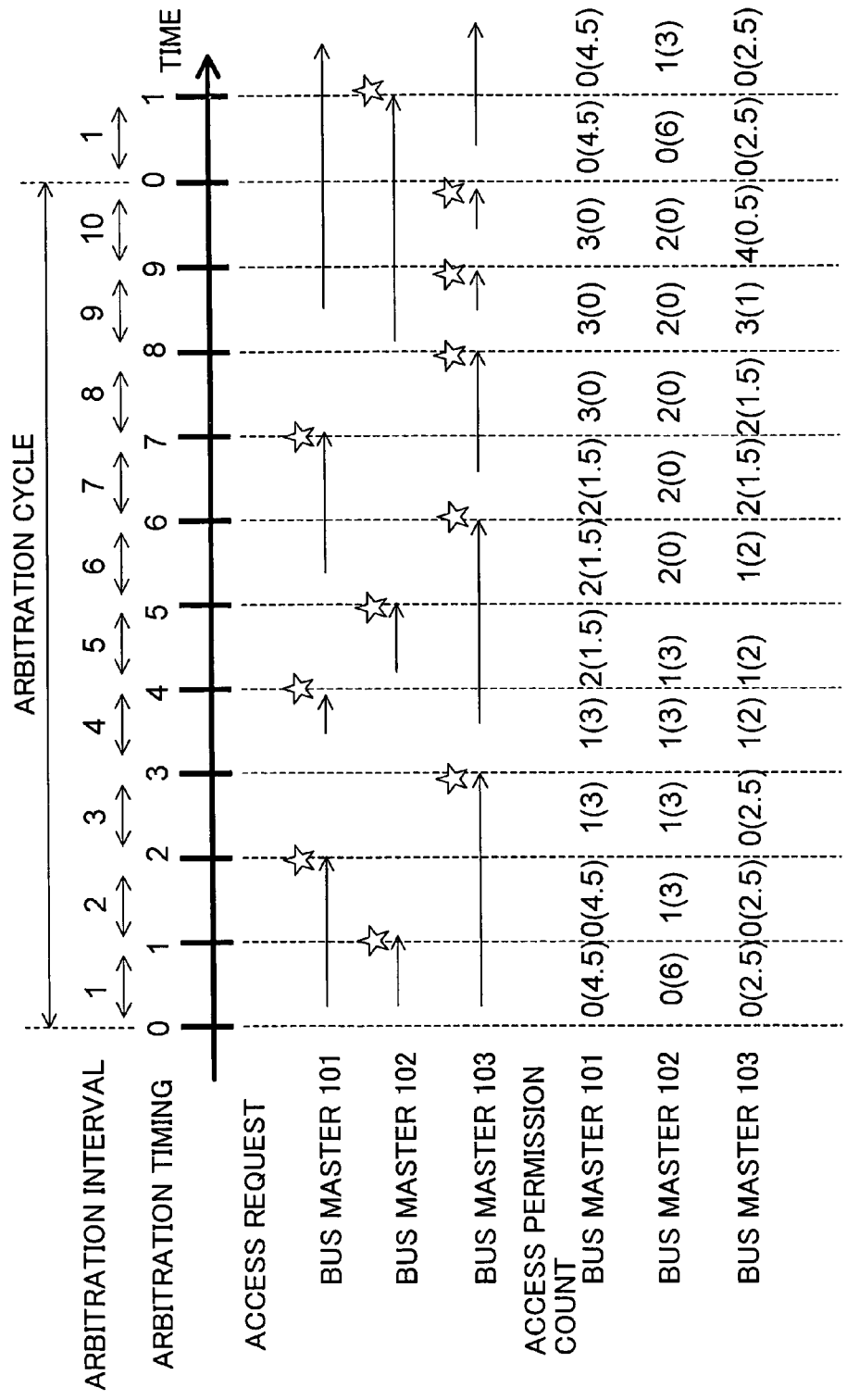
FIG. 20 is a timing diagram showing an example of arbitration based on the bus arbitration information in FIG. 19.

FIG. 20 shows an example of arbitration based on the bus arbitration information 106 shown in FIG. 19. In this example, values inside the parentheses in the bottom part of FIG. 20 represent respective products of the remaining priority permission counts and the access cycles.

In the example of FIG. 20, at arbitration timing 1, all the first through third bus masters 101 through 103 issue access requests. At this arbitration timing 1, the access permission counts 222 associated with all the bus masters are zero and less than the respective count maximum values 221, so that arbitration is performed on all the bus masters based on the priority order information 223. As a result, the second bus master 102 having the largest product gains access permission. When the bus arbitration section 104 gives access permission to the second bus master 102, the bus-arbitration-information management section 105 increments the access permission count 222 associated with the second bus master 102 by one. Thereafter, the second bus master 102 issues an access request after a lapse of three arbitration intervals indicated by the access cycle 224. At next arbitration timing 2, the first bus master 101 and the third bus master 103 issue access requests and the access permission counts 222 associated with these bus masters are less than the count maximum values 221, as at the arbitration timing 1, so that arbitration is performed on both of the bus masters based on the priority order information 223. As a result, the first bus master 101 gains access permission. The bus-arbitration-information management section 105 increments the access permission count 222 associated with the first bus master 101 by one. Thereafter, the first bus master 101 issues an access request after a lapse of 1.5 arbitration intervals indicated by the access cycle 224. Then, at arbitration timing 3, only the third bus master 103 issues an access request, so that the third bus master 103 gains access permission. The bus-arbitration-information management section 105 increments the access permission count 222 associated with the third bus master 103 by one. Thereafter, the third bus master 103 issues an access request after a lapse of 0.5 arbitration intervals indicated by the access cycle 224. At arbitration timings 4, 5, 6, 7 and 8, arbitration is performed in the same manner. At arbitration timing 9, the first through third bus masters 101 through 103 issue access requests. The access permission counts 222 associated with the first bus master 101 and the second bus master 102 have reached the count maximum values 221 and the access permission count 222 associated with the third bus master 103 does not reach the count maximum value 221, so that the third bus master 103 gains access permission. The bus-arbitration-information management section 105 increments the access permission count 222 associated with the third bus master 103 by one. Thereafter, the third bus master 103 issues an access request after a lapse of 0.5 arbitration intervals indicated by the access cycle 224. Then, arbitration is performed in the same manner and, when arbitration at arbitration timing 0 is completed, the access permission counts 222 are reset to zero and one cycle of arbitration is completed. Hereinafter, similar arbitration is performed periodically.

As described above, in the example of FIGS. 19 and 20, the priority order is determined in consideration of the access cycles 224 of the respective bus masters, so that a bus master having a long access cycle does not miss an opportunity for access permission.

The priority order information 223 may be set such that a bus master for which the product of the remaining priority permission count and the access cycle 224 is smaller has higher priority. The access cycles 224 may be set at arbitrary values according to the performance of the respective bus masters. If the products are the same, the priorities may be set at an arbitrary fixed order or may be set by using round robin scheduling or by any other method.

EMBODIMENT 7

Figure 21:
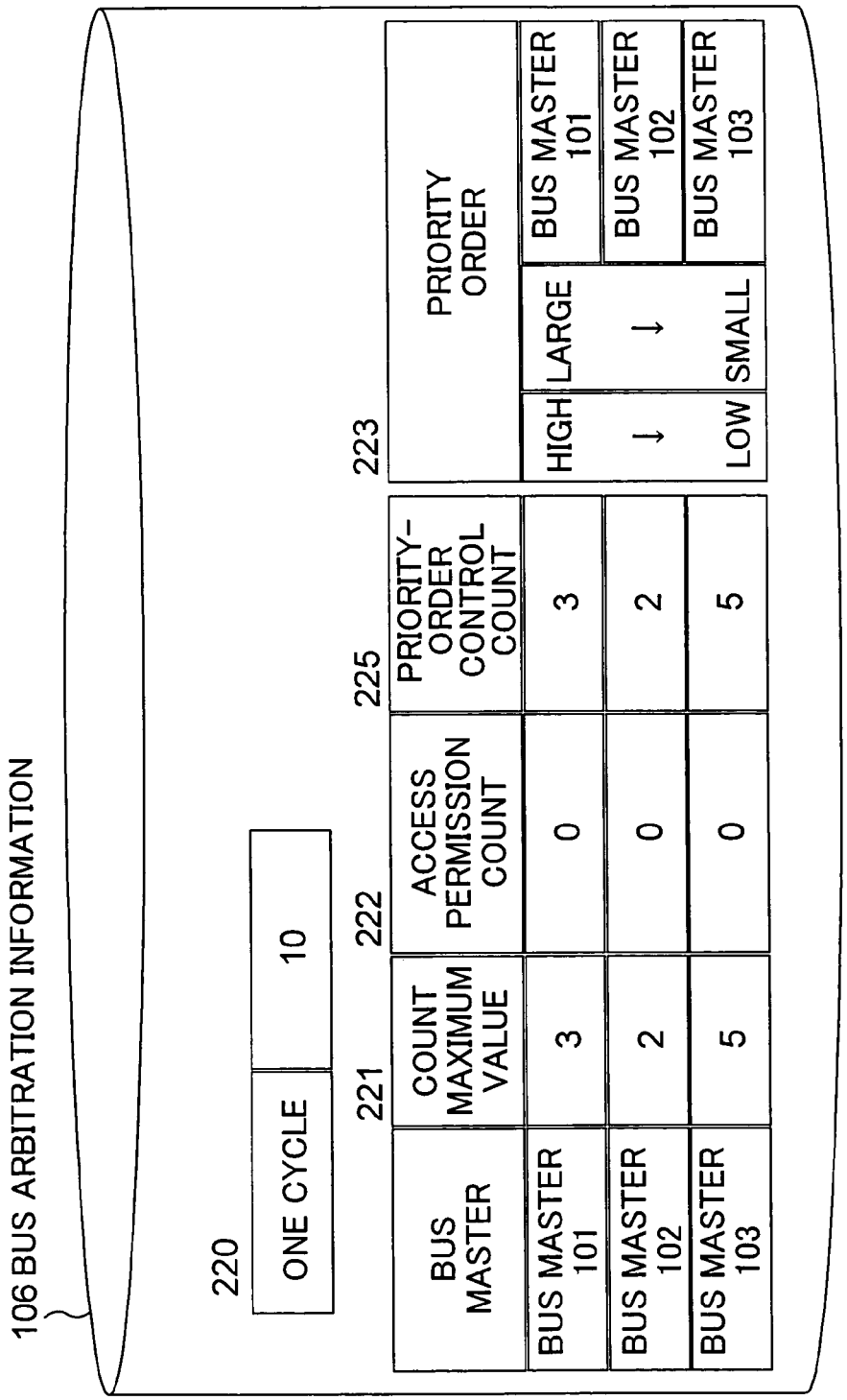
FIG. 21 is a conceptual view showing a seventh example of the bus arbitration information in FIG. 1.

FIG. 21 shows a seventh example of the bus arbitration information 106 shown in FIG. 1. The bus arbitration information 106 shown in FIG. 21 includes priority-order control counts 225 associated with the respective bus masters, in addition to arbitration cycle information 220, count maximum values 221 which are set for the respective bus masters, access permission counts 222 which are set for the respective bus masters and priority order information 223. The priority order information 223 in FIG. 21 shows that a larger priority-order control count 225 has higher priority. If the priority-order control counts 225 are the same, priorities are assigned to the first bus master 101, the second bus master 102 and the third bus master 103 in this order (i.e., a fixed priority order).

As initial values of the priority-order control counts 225, 3, 2 and 5 are set for the first, second and third bus masters 101, 102 and 103, respectively, so as to match with the respective count maximum values 221. These priority-order control counts 225 are sequentially updated with the associated count maximum values 221 and the presence or absence of access permission reflected therein. Specifically, with respect to a bus master which gained access permission, the bus-arbitration-information management section 105 updates the priority-order control count 225 associated this bus master by performing control in which the sum (i.e., the number of arbitrations in one cycle=10) of the count maximum values 221 is subtracted from the priority-order control count 225 and then the count maximum value 221 associated with this bus master is added to the resultant priority-order control count 225 such that this priority-order control count 225 becomes relatively small. On the other hand, with respect to the other bus masters, the bus-arbitration-information management section 105 performs control in which the count maximum values 221 are added to the respective priority-order control counts 225 such that the priority-order control counts 225 associated with the other bus masters become relatively large. In this manner, the same bus master is less likely to gain access permission consecutively.

Figure 22:
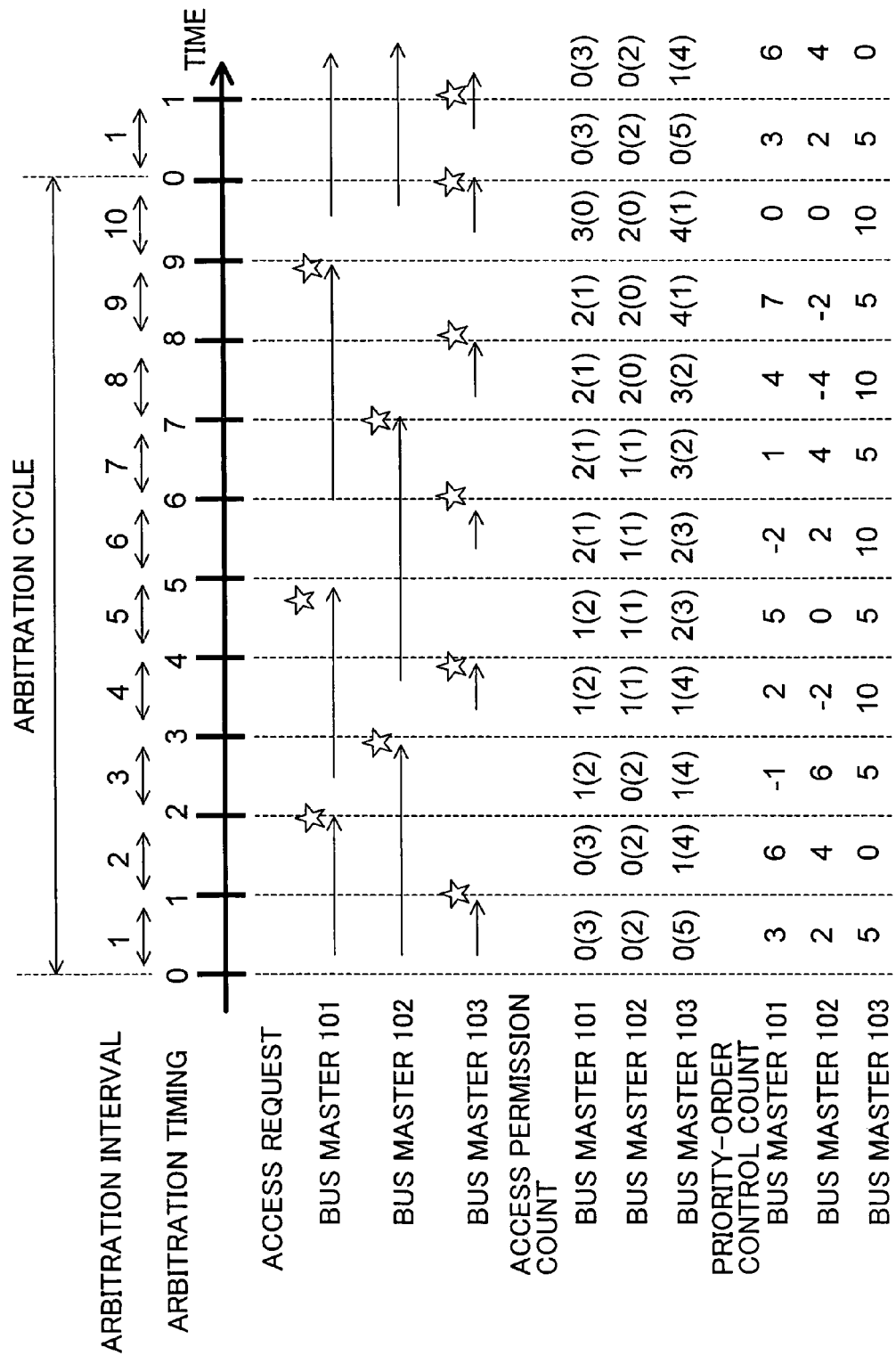
FIG. 22 is a timing diagram showing an example of arbitration based on the bus arbitration information in FIG. 21.

FIG. 22 shows an example of arbitration based on the bus arbitration information 106 in FIG. 21. The lower part of FIG. 22 indicates the access permission counts 222 associated with the first through third bus masters 101 through 103 at arbitration intervals, and the bottom part of FIG. 22 indicates the priority-order control counts 225 associated with the respective first through third bus masters 101 through 103 at arbitration intervals. Values inside the parentheses represent remaining priority permission counts associated with the first through third bus masters 101, 102 and 103, respectively.

In the example of FIG. 22, at arbitration timing 1, all the first through third bus masters 101 through 103 issue access requests. At this arbitration timing 1, the access permission counts 222 associated with all the bus masters 101 through 103 are zero and less than the respective count maximum values 221, so that arbitration is performed on all the bus masters based on the priority order information 223. As a result, the third bus master 103 associated with the largest priority-order control count 225 gains access permission. When the bus arbitration section 104 gives access permission to the third bus master 103, the bus-arbitration-information management section 105 increments the access permission count 222 associated with the third bus master 103 by one. In addition, the bus-arbitration-information management section 105 subtracts 10, which is the sum of the count maximum values 221, from the priority-order control count 225 associated with the third bus master 103 and then adds the count maximum values 221 to the respective priority-order control counts 225 associated with all the bus masters 101 through 103. As a result, the priority-order control count 225 associated with the first bus master 101 becomes 6 (=3+3), the priority-order control count 225 associated with the second bus master 102 becomes 4 (=2+2), and the priority-order control count 225 associated with the third bus master 103 becomes 0 (=5−10+5). At next arbitration timing 2, the first bus master 101 and the second bus master 102 issue access requests and the access permission counts 222 associated with these bus masters are less than the count maximum values 221, as at the arbitration timing 1, so that arbitration is performed on both of the bus masters based on the priority order information 223. As a result, the first bus master 101 which is associated with a larger priority-order control count 225 gains access permission. The bus-arbitration-information management section 105 increments the access permission count 222 associated with the first bus master 101 by one. In addition, the bus-arbitration-information management section 105 subtracts 10, which is the sum of the count maximum values 221, from the priority-order control count 225 associated with the first bus master 101 and then adds the count maximum values 221 to the respective priority-order control counts 225 associated with all the bus masters 101 through 103. As a result, the priority-order control count 225 associated with the first bus master 101 becomes −1 (=6−10+3), the priority-order control count 225 associated with the second bus master 102 becomes 6 (=4+2), and the priority-order control count 225 associated with the third bus master 103 becomes 5 (=0+5). Thereafter, arbitration is performed in the same manner and, when arbitration at arbitration timing 0 is completed, the access permission counts 222 are reset to zero and one cycle of arbitration is completed with the priority-order control counts 225 set at the respective count maximum values 221. Hereinafter, similar arbitration is performed periodically.

As described above, in the example of FIGS. 21 and 22, the priority order is determined using the priority-order control counts 225, so that access permission is uniformly given to the bus masters depending on the count maximum values 221, and concentration of access permission for all the bus masters is avoided. Accordingly, accesses to the shared resource 109 are performed with sufficient time.

In this embodiment, the number of access permissions is limited to the number not exceeding the count maximum values 221 by using the access permission counts 222. Alternatively, arbitration may be performed by using only the priority order determined using the priority-order control counts 225. Another algorithm may be used in updating the priority-order control counts 225. If the priority-order control counts 225 are the same, the priorities may be set at an arbitrary fixed order or may be set by using round robin scheduling or by any other method.

In the foregoing first through seventh embodiments, the number of bus masters is three. However, any number of bus masters may be used in actual application and various types of buses, such as a multilayer bus, may be used. In a configuration in which a plurality of bus masters are connected to one bus, the present invention is applicable to arbitration between these bus masters.

The bus arbitration information 106 may be changed at arbitrary timings during operation of the data processing system 100. All the arbitration intervals may not be the same, and the arbitration intervals may be arbitrarily set. The sum of the count maximum values 221 associated with the respective bus masters may differ from the set value in the arbitration cycle information 220.

In the foregoing description, the access permission count 222 for each bus master is incremented. Alternatively, the remaining priority permission count using the count maximum value 221 in the foregoing description as an initial value may be decremented.

As described in the examples of FIGS. 5 and 6 in the first embodiment, in the second through seventh embodiments, the second priority rule may be employed in arbitrating access requests among a plurality of bus masters associated with the remaining priority permission counts which are zero.

A plurality of sets of count maximum values 221 may be provided such that switching is performed from one set to another at, for example, every one arbitration cycle. For example, different arbitration algorithms may be employed for respective arbitration cycles. The bus masters may be divided into a plurality of groups so that different arbitration algorithms are employed for the respective groups.

As described above, in the resource management device according to the present invention the minimum access bandwidth is guaranteed for each master even if a master having the highest priority has not been previously determined at each arbitration timing. Accordingly, the resource management device according to the present invention is applicable to system LSI and the like in a preferable manner.

What is claimed is:

1. A resource management device provided between at least one shared resource and a plurality of masters, the device comprising:
   an arbitration-information management section managing a set value for each of the masters as arbitration information;
   an arbitration section arbitrating access requests from the respective masters to the shared resource based on the arbitration information; and
   a resource control section controlling data transmission between the shared resource and one of the masters to which the arbitration section gives access permission,
   wherein in a situation in which two or more of the masters issue access requests at the same time, the arbitration section preferentially gives access permission to a master whose number of permission counts for access to the shared resource from a given point of time in the past is less than the set value, out of said two or more access request masters.

2. The device of claim 1, wherein the arbitration-information management section includes priority order information on a priority order among the masters, and in a situation in which out of said two or more access request masters, each of a plurality of access request masters has access permission counts from the given point of time less than the set value, the arbitration section arbitrates the access requests according to a first priority rule based on the priority order information.

3. The device of claim 2, wherein the first priority rule is a rule based on a fixed priority order among the masters.

4. The device of claim 3, wherein the fixed priority order among the masters is determined according to the set values.

5. The device of claim 2, wherein the first priority rule is a rule of round robin scheduling in which the priority order among the masters is sequentially changed.

6. The device of claim 2, wherein the first priority rule is a rule based on the priority order among the masters, and the priority order is sequentially determined according to remaining priority permission counts each obtained by subtracting the number of access permission counts from the set value.

7. The device of claim 6, wherein the arbitration-information management section sequentially updates the priority order information such that one of the masters which gained no access permission in current arbitration and is associated with a largest remaining priority permission count has highest priority in next arbitration.

8. The device of claim 7, wherein priorities of the masters except for the master having the highest priority are cyclically determined in the next arbitration with the master having the highest priority used as a start point.

9. The device of claim 6, wherein the arbitration-information management section sequentially updates the priority order information such that one of the masters which gained access permission in current arbitration has the lowest priority in next arbitration and the other masters have priorities according to the remaining priority permission counts.

10. The device of claim 1, wherein one of the masters which gained access permission at current arbitration is removed from access permission candidates in at least next arbitration.

11. The device of claim 10, wherein even in a situation in which one of the masters which gained access permission in current arbitration is removed from access permission candidates, the removed master is allowed to gain access permission as long as each of the other masters as the access permission candidates issues no access request.

12. The device of claim 2, wherein the first priority rule is a rule based on the priority order among the masters according to a mode of access to the shared resource.

13. The device of claim 2, wherein the first priority rule is a rule based on the priority order among the masters, and the priority order is determined according to LRU (Least Recently Used) algorithm.

14. The device of claim 2, wherein the arbitration-information management section further includes information on an access cycle for each of the masters, and the first priority rule is a rule based on the priority order among the masters, and
   the priority order is sequentially determined according to the products each obtained by multiplying, by the access cycle, a remaining priority permission count obtained by subtracting the number of access permission counts of an associated one of the masters from the set value.

15. The device of claim 2, wherein the arbitration-information management section further includes, for each of the masters, priority-order control count information which is sequentially updated with an associated one of the set values and the presence or absence of access permission reflected therein, and the first priority rule is a rule based on the priority order among the masters, and the priority order is sequentially determined according to the priority-order control count information such that an opportunity in which one of the masters consecutively gains access permission is reduced.

16. The device of claim 2, wherein in a situation in which none of said two or more access request masters has access permission counts less than the set value and each of a plurality of access request masters out of said two or more access request masters has access permission counts equal to the set value, the arbitration section arbitrates the access requests according to a second priority rule based on the priority order information.

17. The device of claim 16, wherein the second priority rule is a rule based on a fixed priority order among the masters.

18. The device of claim 16, wherein the second priority rule is a rule of round robin scheduling in which the priority order among the masters is sequentially changed.

19. A resource management method in a system in which a plurality of masters issue access requests to at least one shared resource, the method comprising the steps of:

managing, as arbitration information, priority order information on a priority order among the masters and a set value for each of the masters;

in a situation in which two or more of the masters issue access requests at the same time, preferentially giving access permission to an access request master whose number of permission counts for access to the shared resource from a given point of time is less than the set value, out of said two or more access request masters; and in a situation in which out of said two or more access request masters, each of a plurality of access request masters whose number of permission counts for access to the shared resource from a given point of time in the past is less than the set value, arbitrating the access requests according to a first priority rule based on the priority order information.

20. The method of claim 19, wherein in a situation in which none of said two or more access request masters has access permission counts less than the set value and each of a plurality of access request masters out of said two or more access request masters has access permission counts equal to the set value, the method further comprises the step of arbitrating the access requests according to a second priority rule based on the priority order information.

* * * * *